US00RE37508B1

(19) United States
(12) Reissued Patent
Taylor et al.

(10) Patent Number: US RE37,508 E
(45) Date of Reissued Patent: Jan. 15, 2002

(54) FAST VIDEO MULTIPLEXING SYSTEM

(75) Inventors: Eric Taylor, Irvine; Marius van der Watt, Orange, both of CA (US)

(73) Assignee: Interlogix, Inc., Austin, TX (US)

(21) Appl. No.: 09/368,887

(22) Filed: Aug. 5, 1999

Related U.S. Patent Documents

Reissue of:
(64) Patent No.: 5,654,758
Issued: Aug. 5, 1997
Appl. No.: 08/439,974
Filed: May 12, 1995

(51) Int. Cl.[7] ..... H04N 7/26
(52) U.S. Cl. ..... 348/385.1; 348/387.1
(58) Field of Search ..... 348/385–389, 348/24, 705, 153, 159; H04N 7/015, 7/26

(56) References Cited

U.S. PATENT DOCUMENTS 4,004,084 A * 1/1977 Brown et al. ..... 348/385
4,994,916 A * 2/1991 Pshtissky ..... 348/159

FOREIGN PATENT DOCUMENTS

JP 0154288 * 7/1986 ..... 348/385
JP 0135182 * 6/1991 ..... 348/385

* cited by examiner

*Primary Examiner*—Victor R. Kostak
(74) *Attorney, Agent, or Firm*—Stoel Rives LLP

(57) ABSTRACT

The invention provides a method and apparatus for processing video data signals to generate a time division multiplexed video signal which incorporates a maxima number of fields from successive selected video input signals. The invention provides dual video decoder channels associated synchronisation circuits for generating an early synchronisation signal. The early synchronisation signals are applied to control inputs of the video decoders to enable reading of their output earlier than would normally be possible, avoiding delays in the combining of successive fields of video information in the video TDM signal. The provision of dual channels avoids delays due to lack of synchronisation between the different video sources.

18 Claims, 33 Drawing Sheets

FROM FIG. 5A

ASYNCHRONOUS INPUTS
SYNCHRONIZED

ASYNCHRONOUS INPUTS
SYNCHRONIZED

TO FIG. 6I

FAST VIDEO MULTIPLEXING SYSTEM

Matter enclosed in heavy brackets [ ] appears in the original patent but forms no part of this reissue specification; matter printed in italics indicates the additions made by reissue.

BACKGROUND OF THE INVENTION

This invention relates to a method of and apparatus for processing video data signals, to combine a plurality of video data signals into a multiplexed signal.

Video time-division multiplexers (video TDM's) are known in which a plurality of input video data signals, typically from several video cameras, are combined into a single video data stream. This data stream comprises interleaved time-sliced video data or "map shots" from each of the cameras or other video input sources. A typical time-slice or snap shot of a video TDM signal is one field of an input video data signal. Each snap shot or field is typically marked so that the multiplexed video data stream can be separated and reconstructed or decoded into its component parts, which are the original separate input video data signals. The use of video TDM's permits data from a plurality of video sources to be recorded or transmitted on a single medium by time sharing the medium between the different sources, reducing the capital and operating costs of the overall installation.

A disadvantage of known video TDM's is that the time division multiplexed output, by its definition is non-continuous for any one video input source. This is because, for any one video input source, there will be periods of time (during which the remaining of the plurality of the video input sources each have a field inserted into the multiplexed video data signal) that no field or snap shot from that particular video source is inserted into the multiplexed signal. The problem is exacerbated in the case of non-synchronised video sources.

It is an object of the invention to minimise the amount of data which is lost due to this phenomenon.

SUMMARY OF THE INVENTION

According to the invention a method of processing video signals comprises:

(a) selecting one of a plurality of video input signals;

(b) applying the selected video input signal to an analog to digital video decoder;

(c) deriving from the selected video input signal an early synchronisation signal corresponding to the start of a field of the signal;

(d) applying the early synchronisation signal to a control input of the video decoder to enable an output of the video decoder;

(e) reading data from the enabled output corresponding to the first available field of the selected video input signal;

(f) repeating steps (a) to (e) for further selected video input signals; and (g) combining the data read from the enabled output of the video decoder in each step (e) to form a time division multiplexed video signal.

The steps (a) to (f) may be carried out simultaneously and independently for successively selected input video signals, to allow successive fields of the time division multiplexed video signal to be combined without delays caused by lack of synchronisation between the selected video input signals.

The early synchronisation signal is preferably derived from the selected video input signal by independently extracting vertical synchronisation information from the signal while the signal is undergoing analog to digital conversion.

Preferably, the time division multiplexed video signal data read from the output of the video decoder is encoded by a digital to analog video encoder for storage or transmission in analog form.

Further according to the invention apparatus for processing video signals comprises:

switch means for selecting any one of a plurality of video input signals;

an analog to digital video decoder connected to an output of the switch means;

a synchronisation circuit associated with the video decoder for generating an early synchronisation signal from a selected video input signal corresponding to the start of a field of the signal and for applying the early synchronisation signal to a control input of the video decoder to enable an output thereof;

storage means connected to the output of the video decoder for storing data therefrom corresponding to the first available field of the selected video input signal; and encoder means for combining data from the storage means corresponding to successive fields of selected video input signals into a time division multiplexed video signal.

The synchronisation circuit may comprise a video sync separator arranged to extract vertical synchronisation information from the video input signal independently while the signal is undergoing analog to digital conversion.

The synchronisation circuit preferably further includes timer means arranged to generate an early vertical synchronisation signal derived from a composite sync signal output of the video sync separator.

The storage means may comprise at least one random access memory arranged to store data corresponding to a single field of video data.

The invention extends to apparatus for processing a plurality of unsynchronised video signals comprising the above defined apparatus arranged in dual channels and including control means for selecting different video sources for each of the channels, and for combining stored data from the respective channels corresponding to successive fields of the different video sources.

DESCRIPTION OF AN EMBODIMENT

Figure 1:
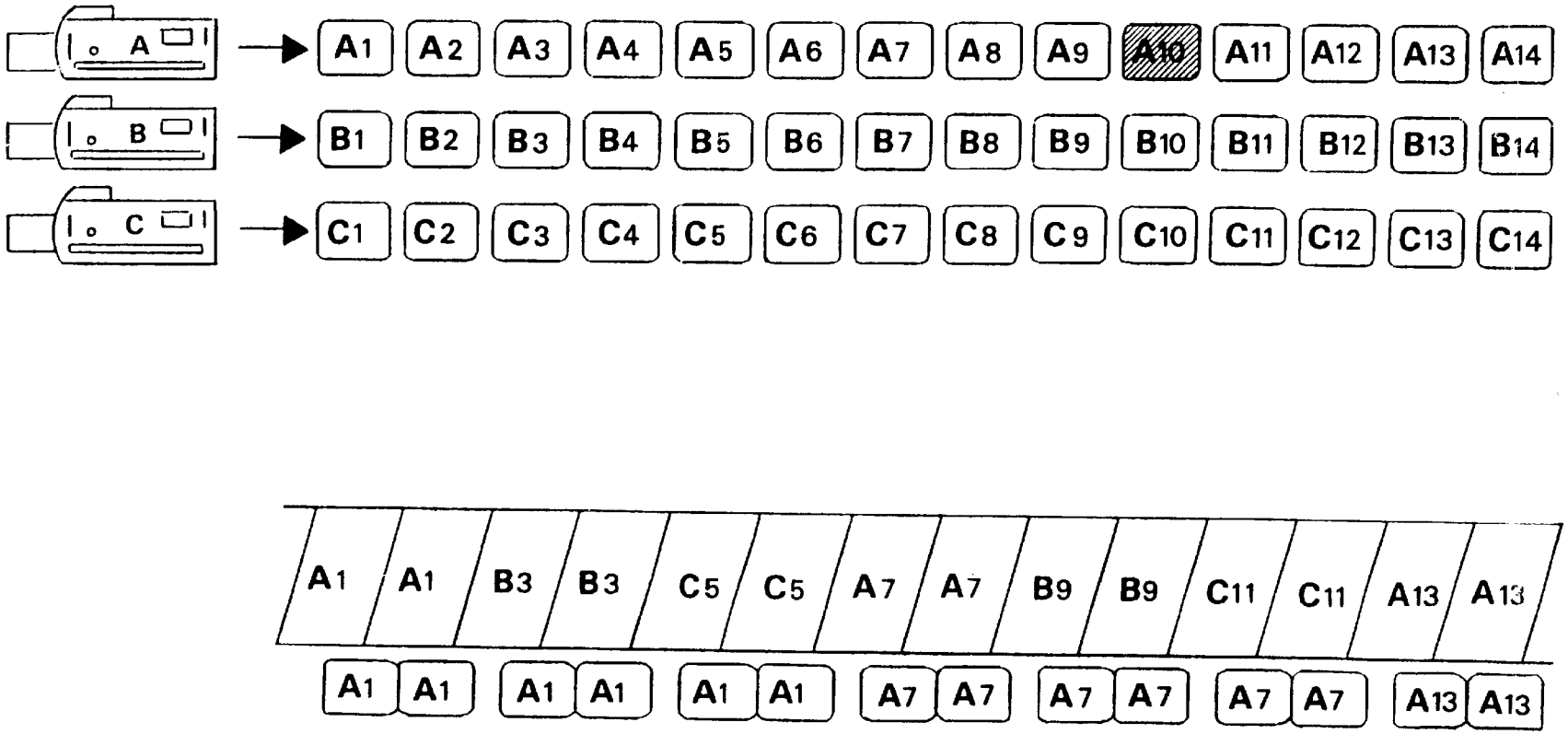
FIG. 1 is a diagrammatic illustration of the output of a prior art TDM system.

In a conventional TDM system there is some delay in switching between the outputs of respective video data sources A, B and C. Such system cope with the delay by repeating fields from each source while waiting to switch to the next source. For example, in FIG. 1, field 1 from source A is repeated before a switch can be made to source B, and so on. This reduces the mount of useful data carried by the system. Due to the typically asynchronous nature of different video sources, a finite time is required for synchronisation during the switching from one input video source to the start of a field from the next video source. This problem can be addressed by the synchronisation and phase-locking of the different input video sources. However, this is generally not practical and is costly, as it requires that the synchronising signals be passed between the different sources. Apart from this, the cost of providing very fast switches to switch between successive video sources is relatively high.

Figure 2:
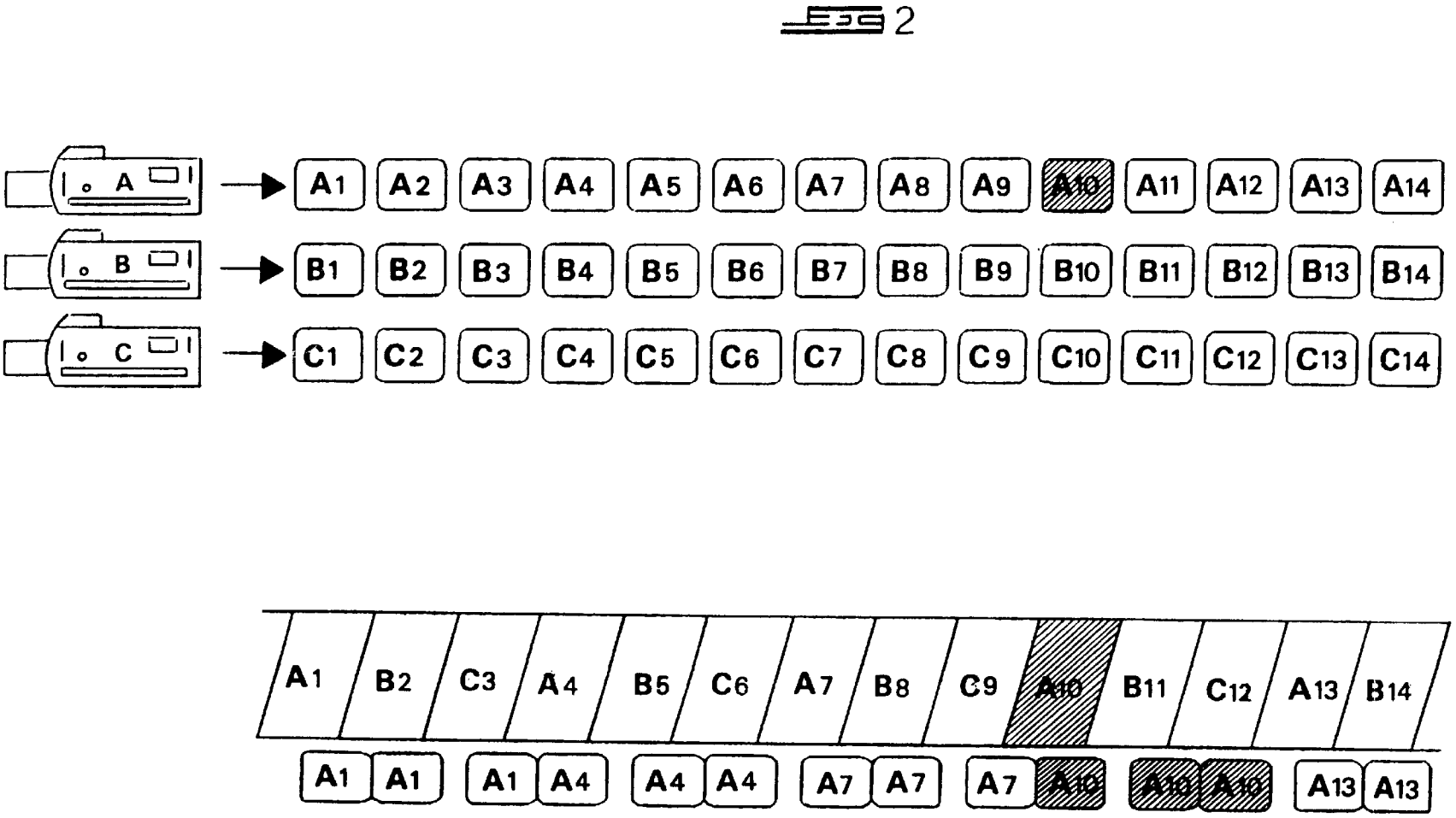
FIG. 2 is a similar diagram to that of FIG. 1, showing the output of a video TDM system according to the invention.

The present invention addresses the problem of switching rapidly between a plurality of unsynchronised video sources in a more economical way, and ensures that the video TDM will update each input video source at the maximum possible rate. This is achieved by providing, in addition to a conventional video decoder IC, a separate video sync separator coupled with timers for counting video sync lines, to generate a valid "good video" signal without the need for a delay of one field duration after switching. This separate synchronisation circuit generates fast vertical synchronising signals and is enhanced to provide early detection of vertical sync. Dual decoder channels incorporating the above features are used to ensure that the presence of non-synchronous input video sources does not result in duplication of fields in the multiplexed video signal, increasing the number of different fields transmitted from each video source, as shown in FIG. 2.

Figure 3:
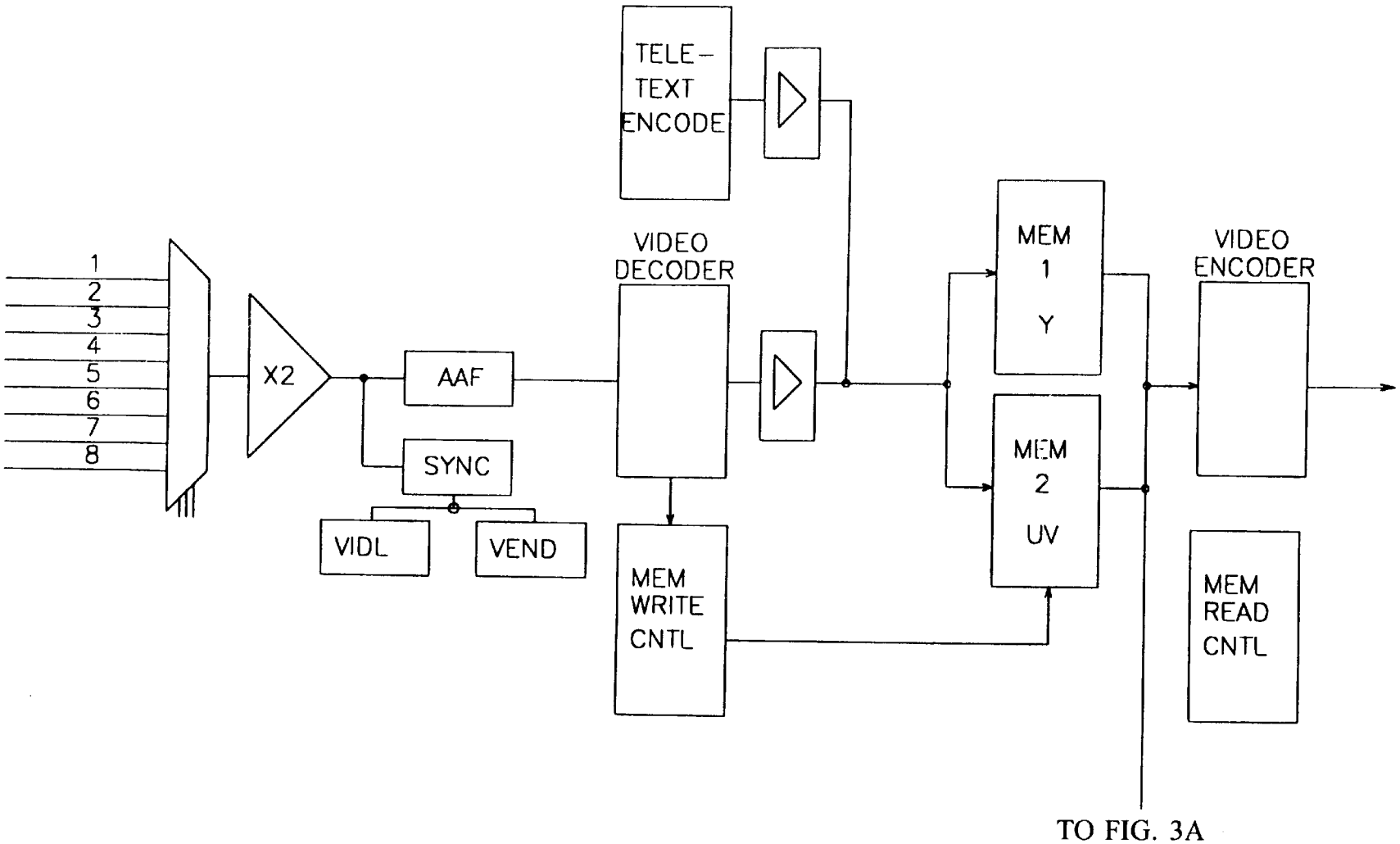
FIGS. 3 and 3A are a simplified block schematic diagram of video TDM apparatus according to the invention.
Figure 3A:
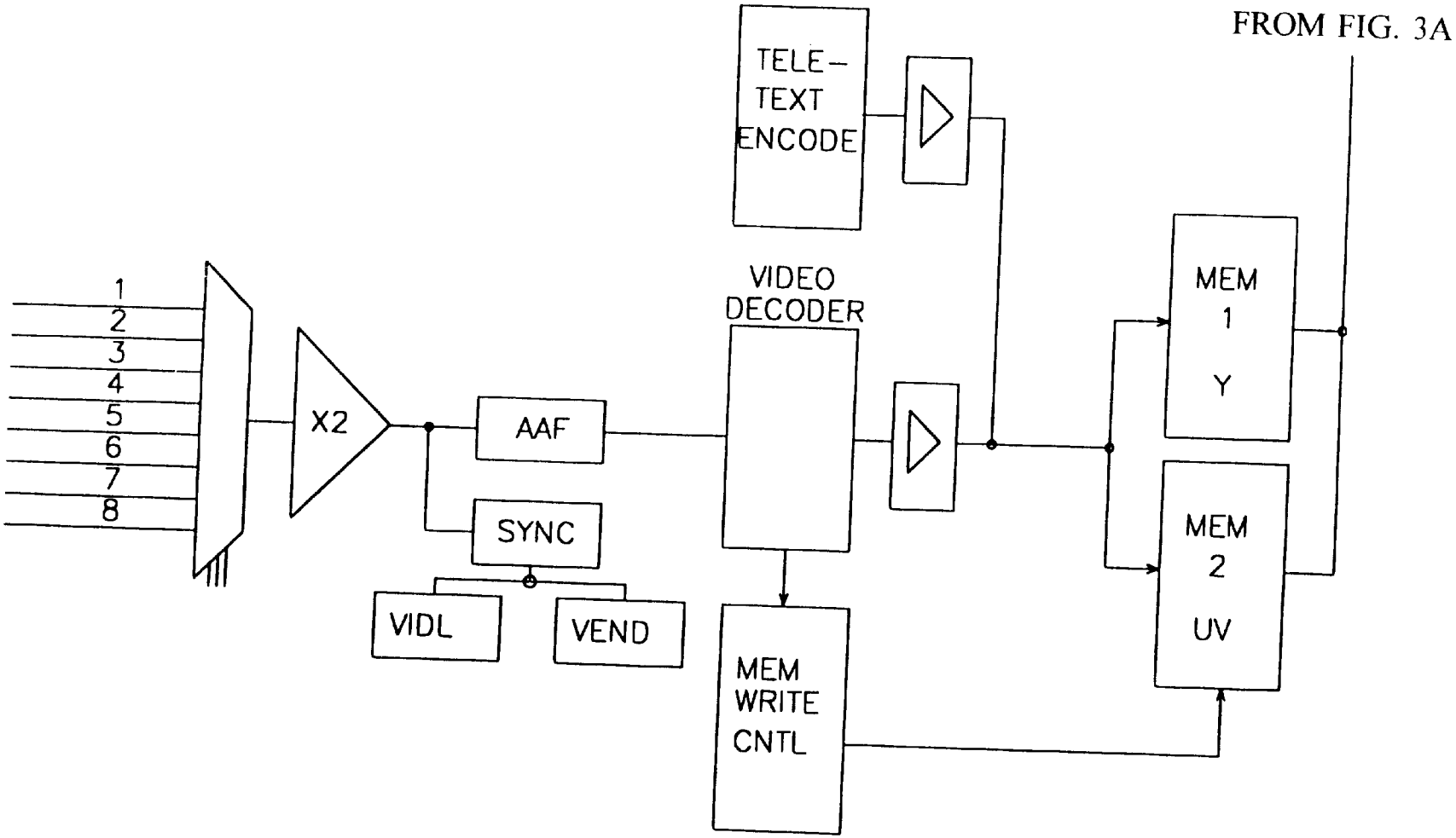
Figure 4:
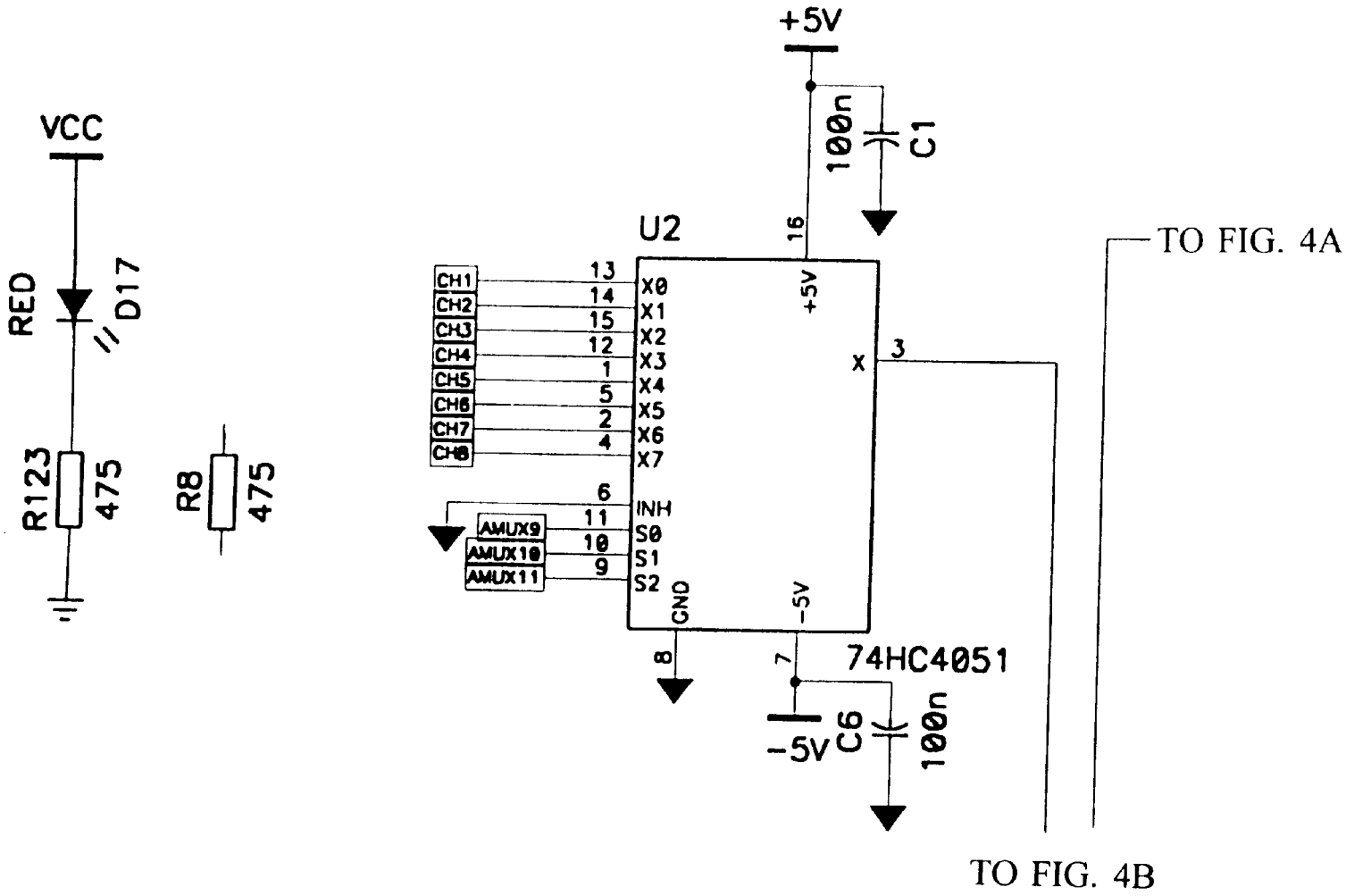
FIGS. 4, 4A–4L, 5, 5A–5K, 6, and 6A–6J are schematic circuit diagrams illustrating the circuitry of FIGS. 3 and 3A in greater detail.
Figure 4A:
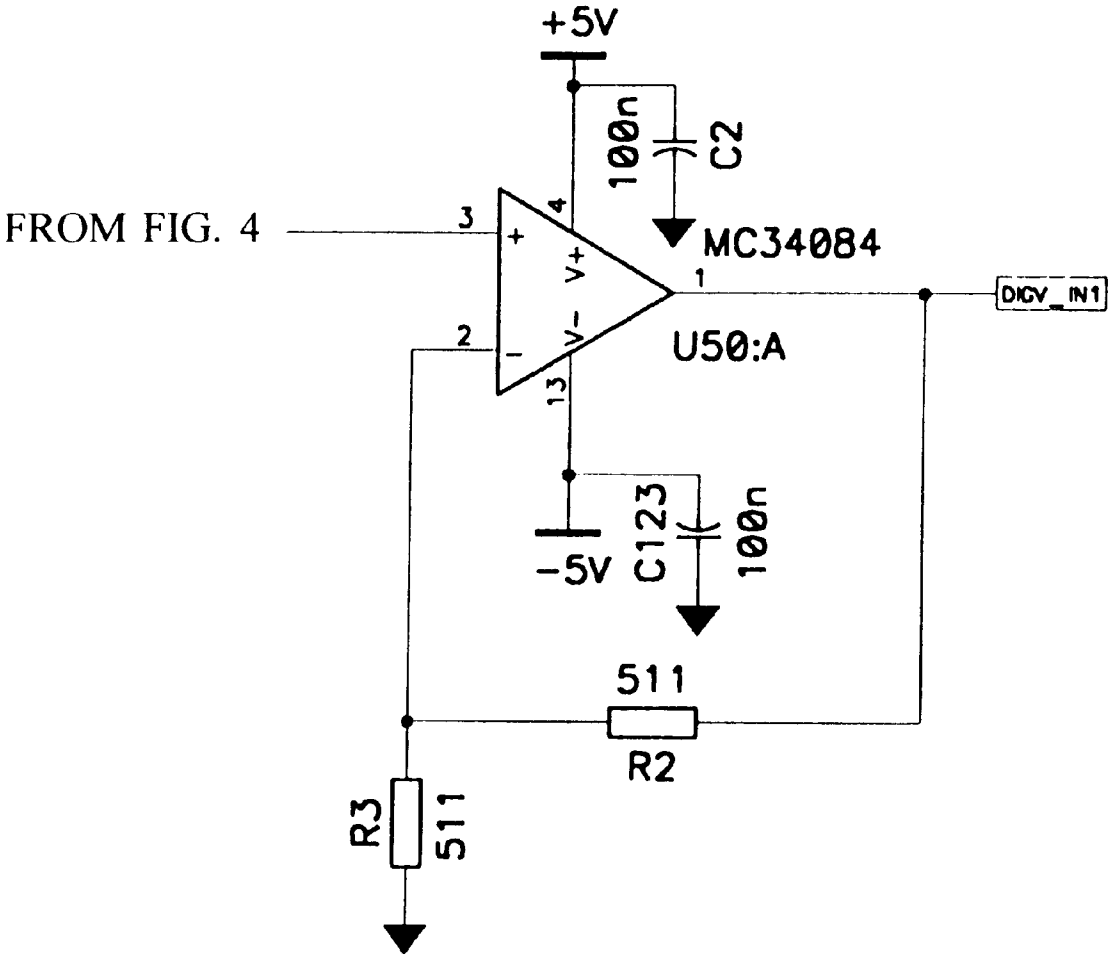
Figure 4B:
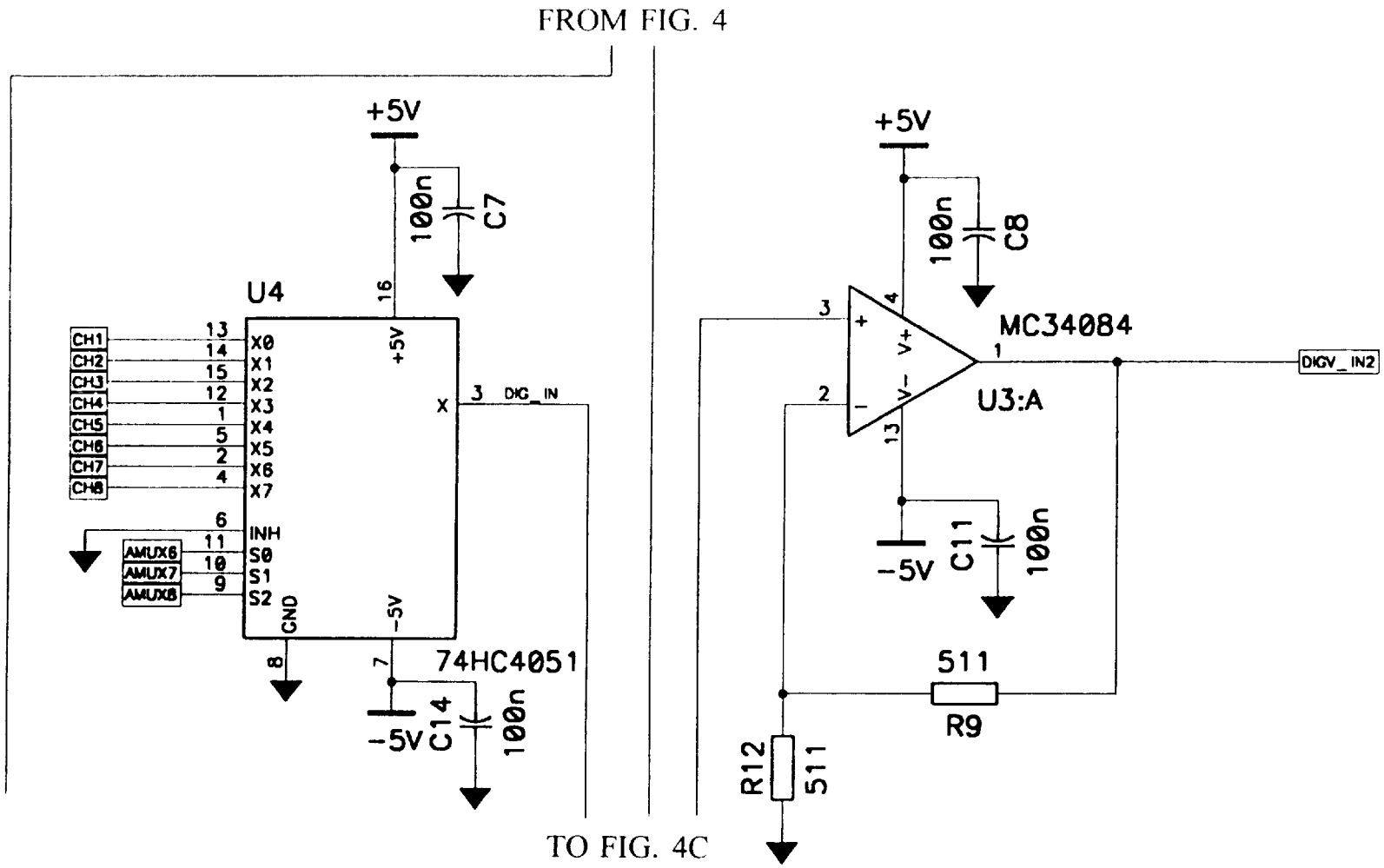
Figure 4C:
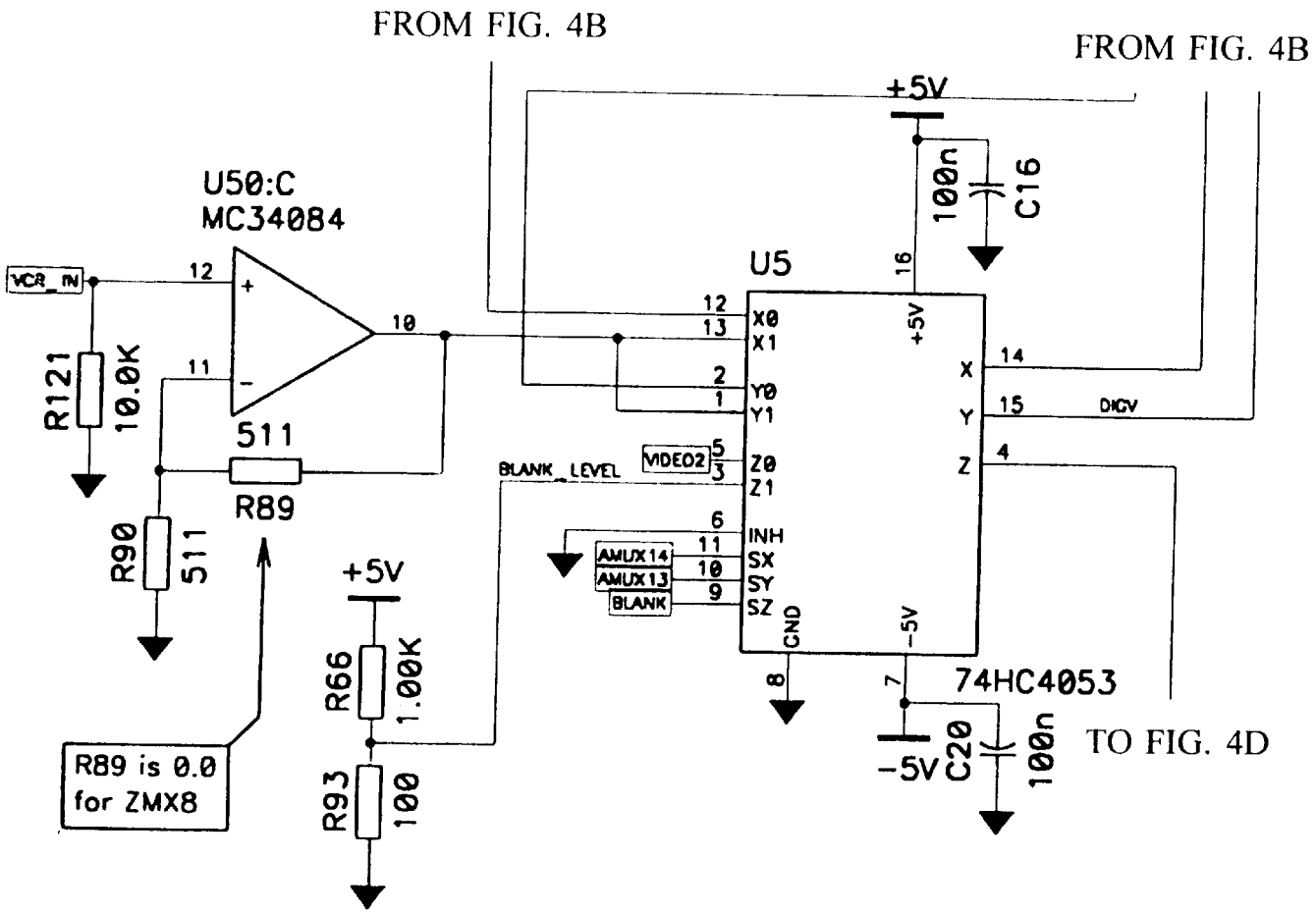
Figure 4D:
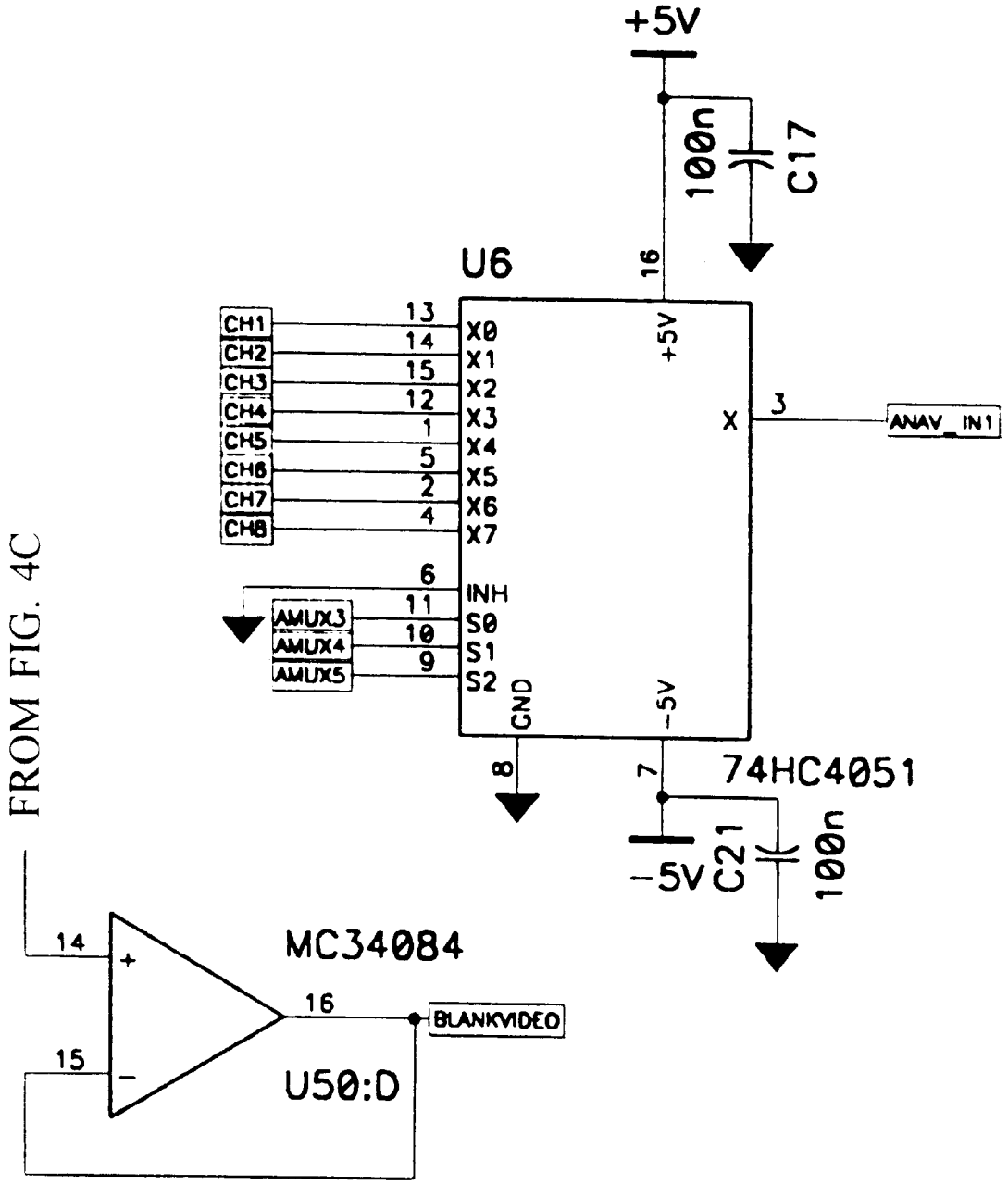
Figure 4E:
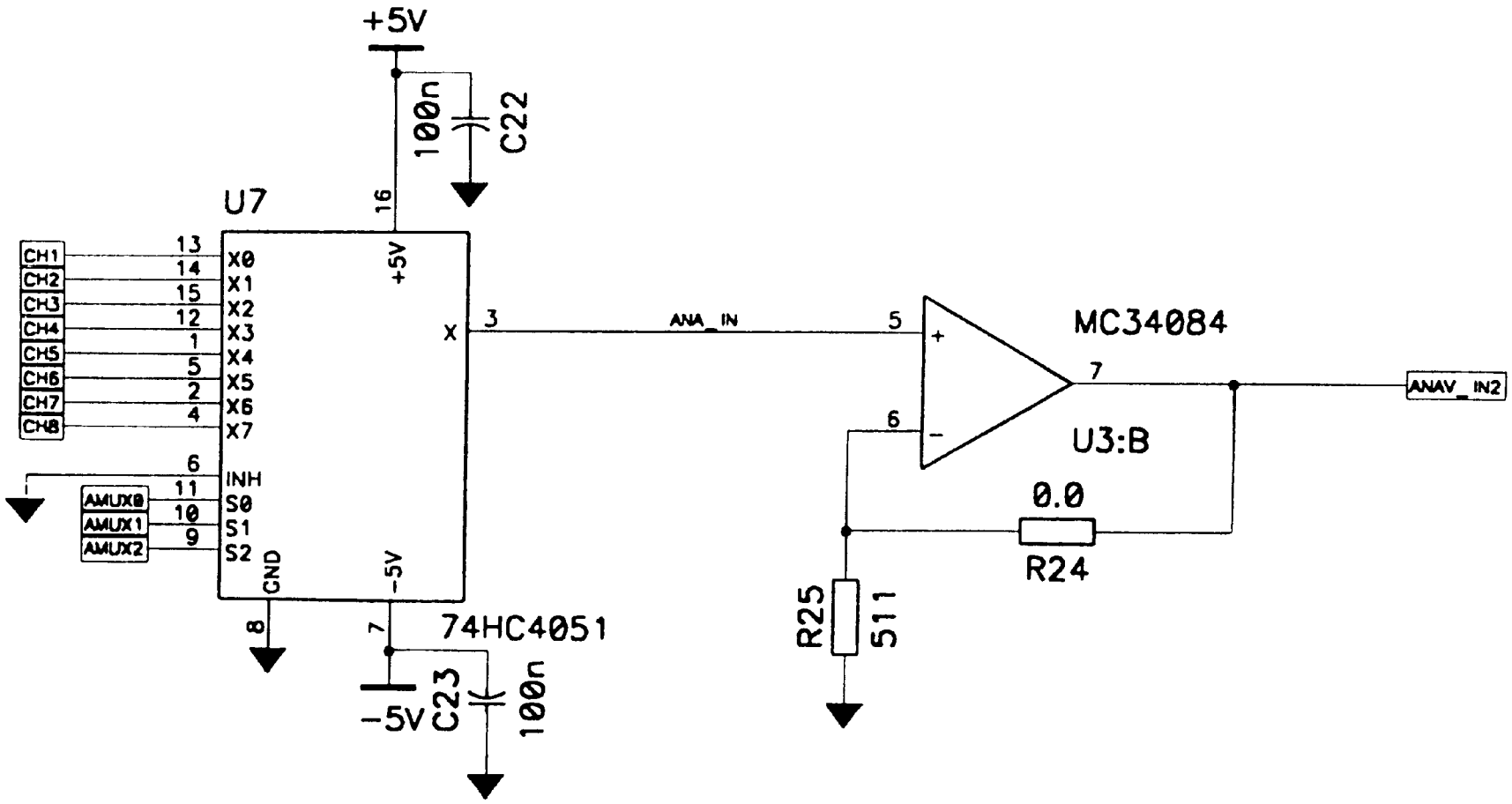
Figure 4F:
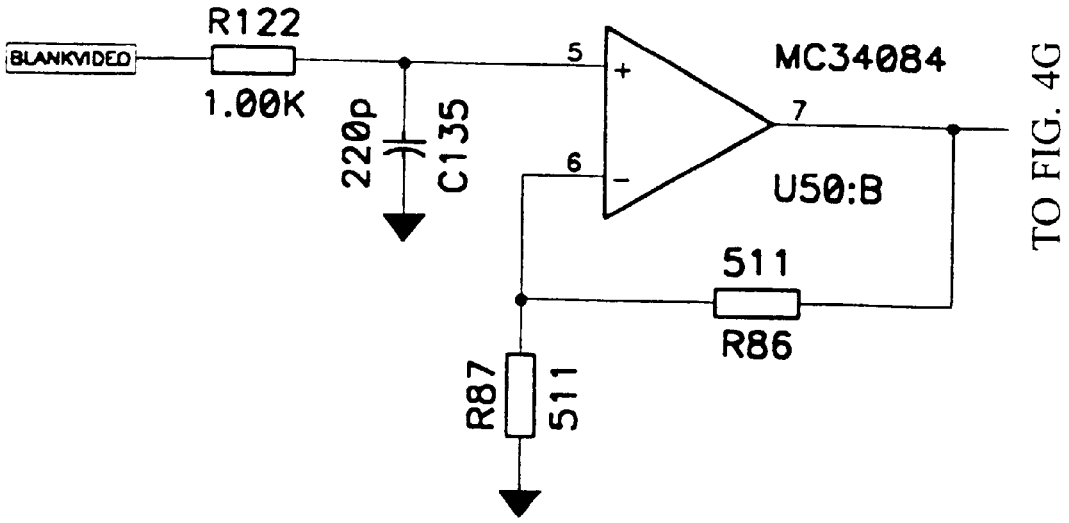
Figure 4G:
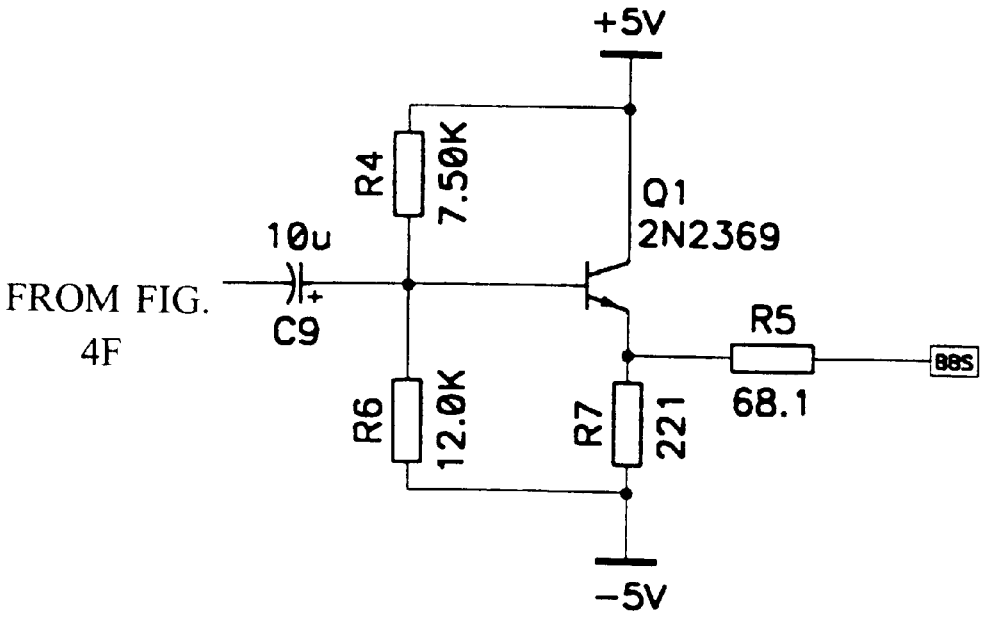
Figure 4H:
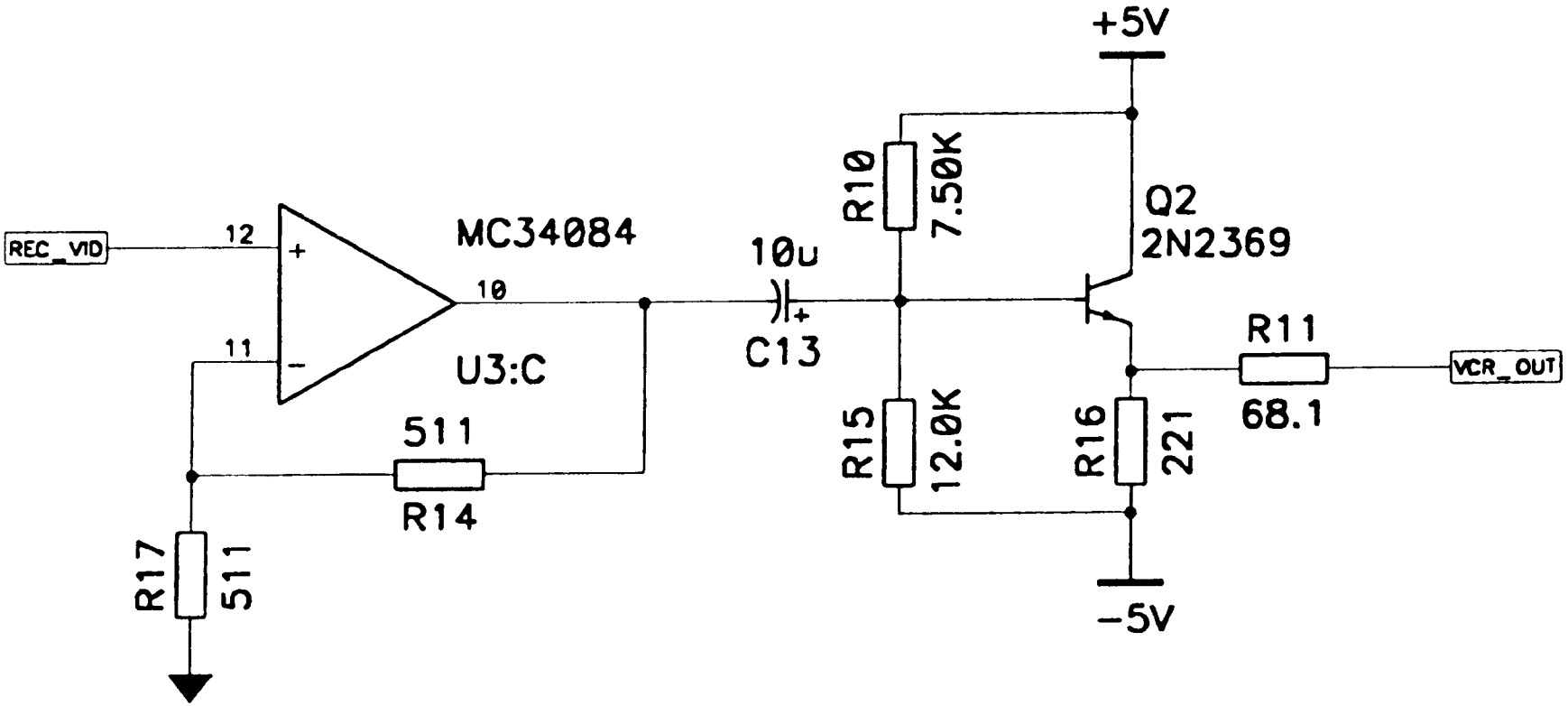
Figure 4I:
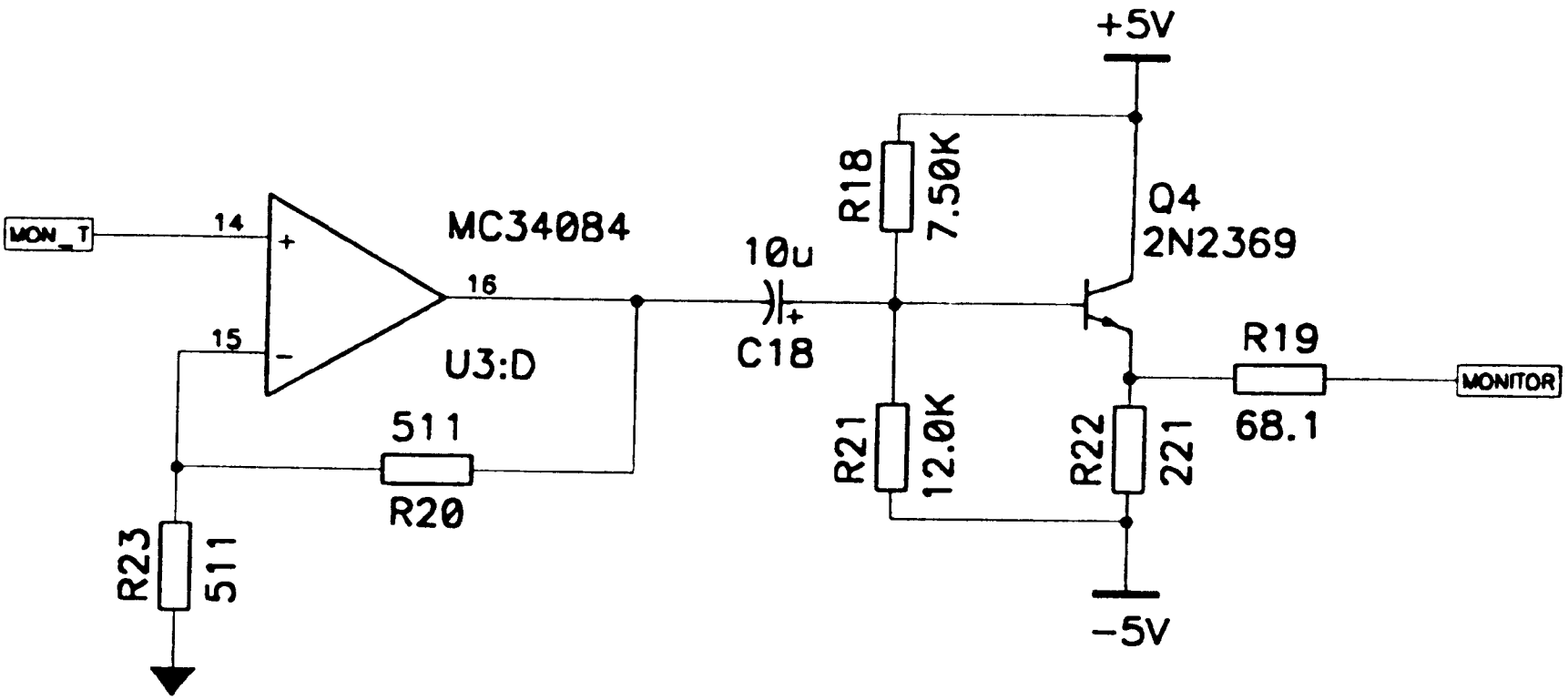
Figure 4J:
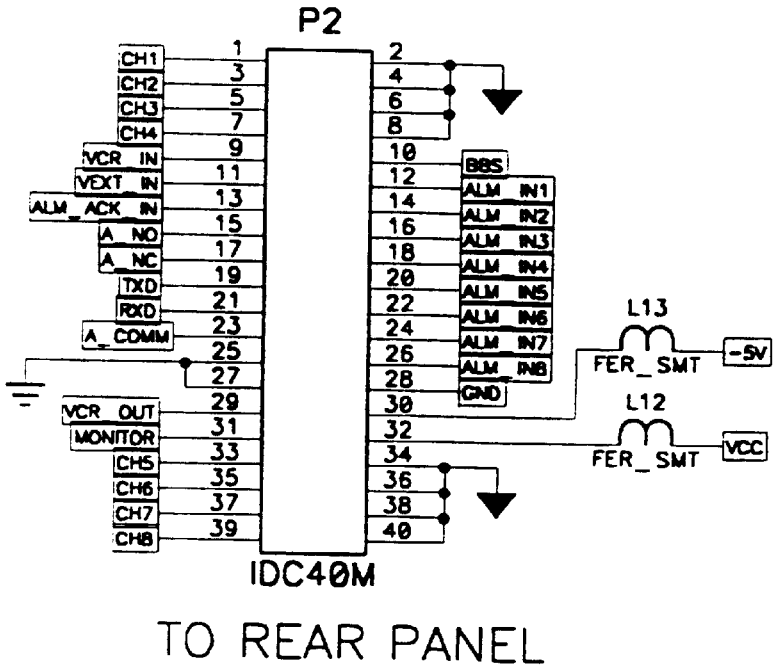
Figure 4K:
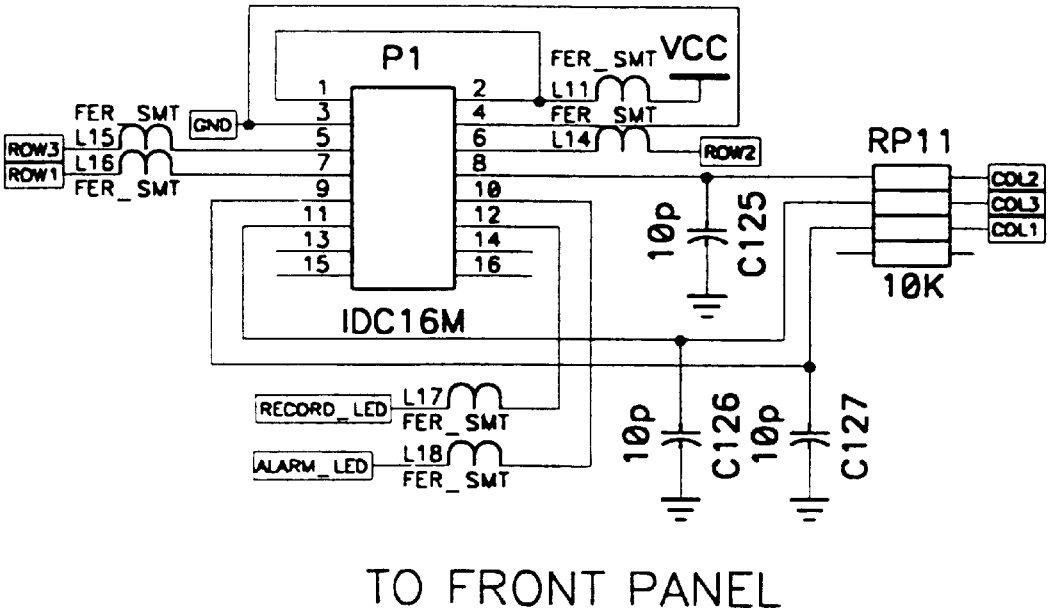
Figure 4L:
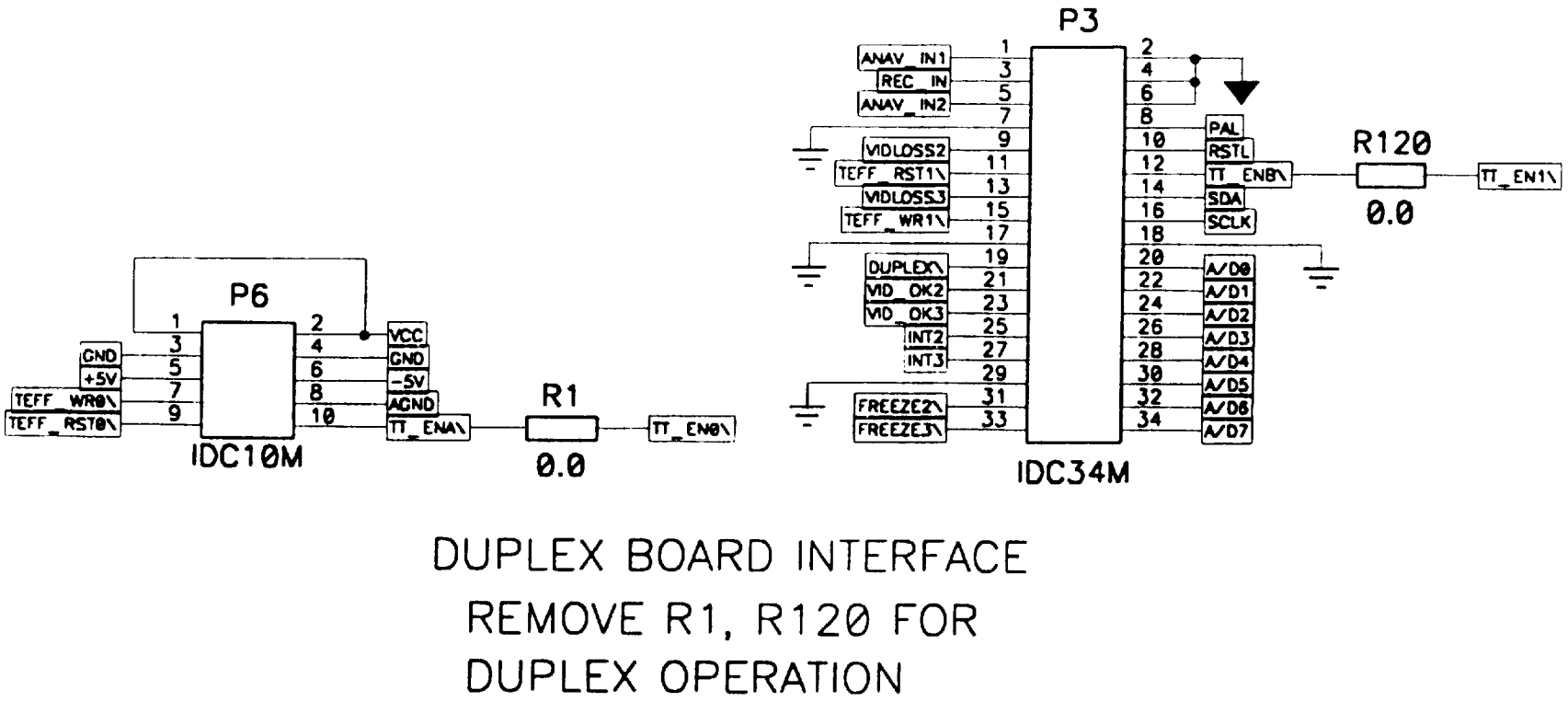
Figure 5:
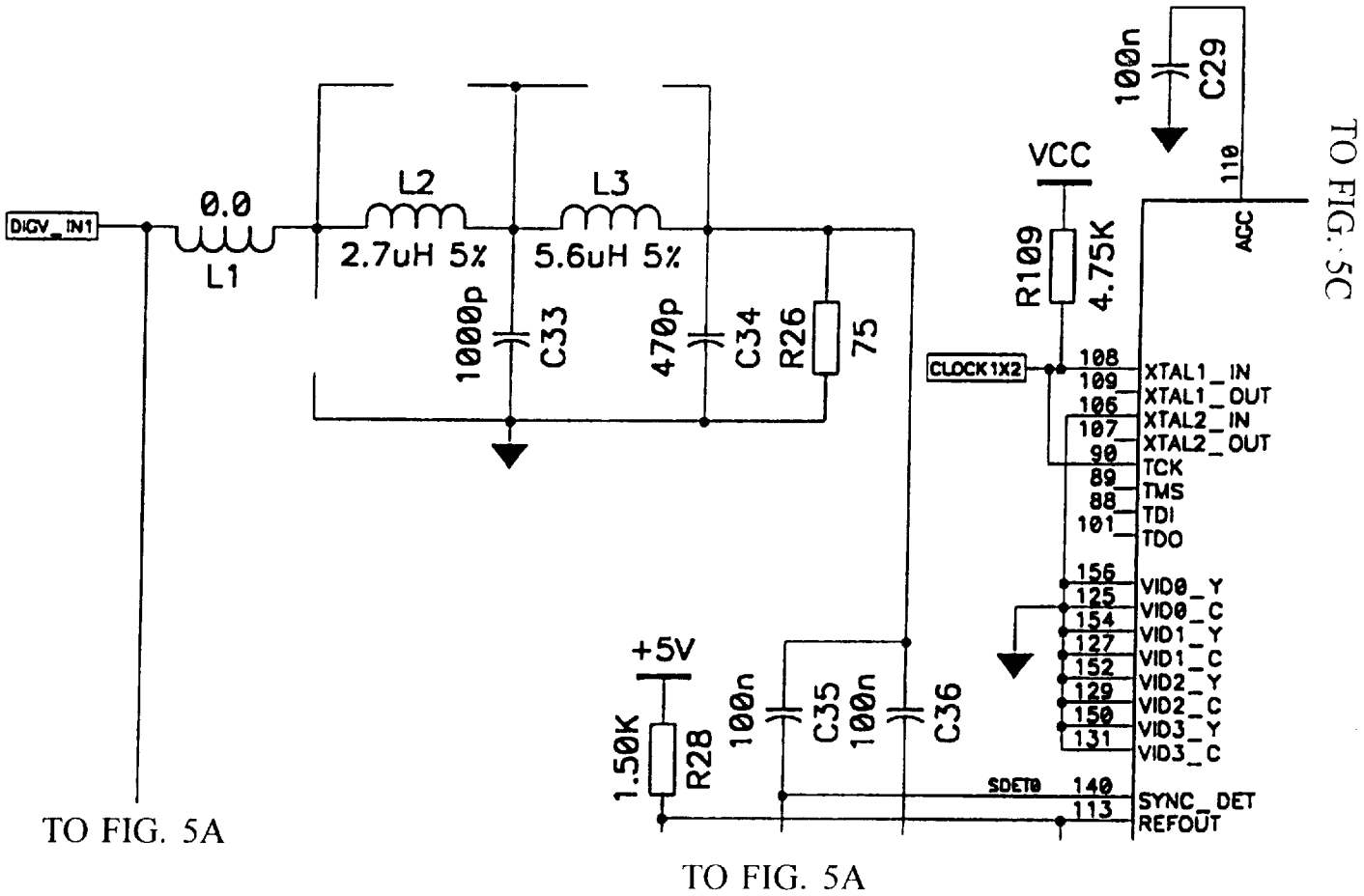
Figure 5A:
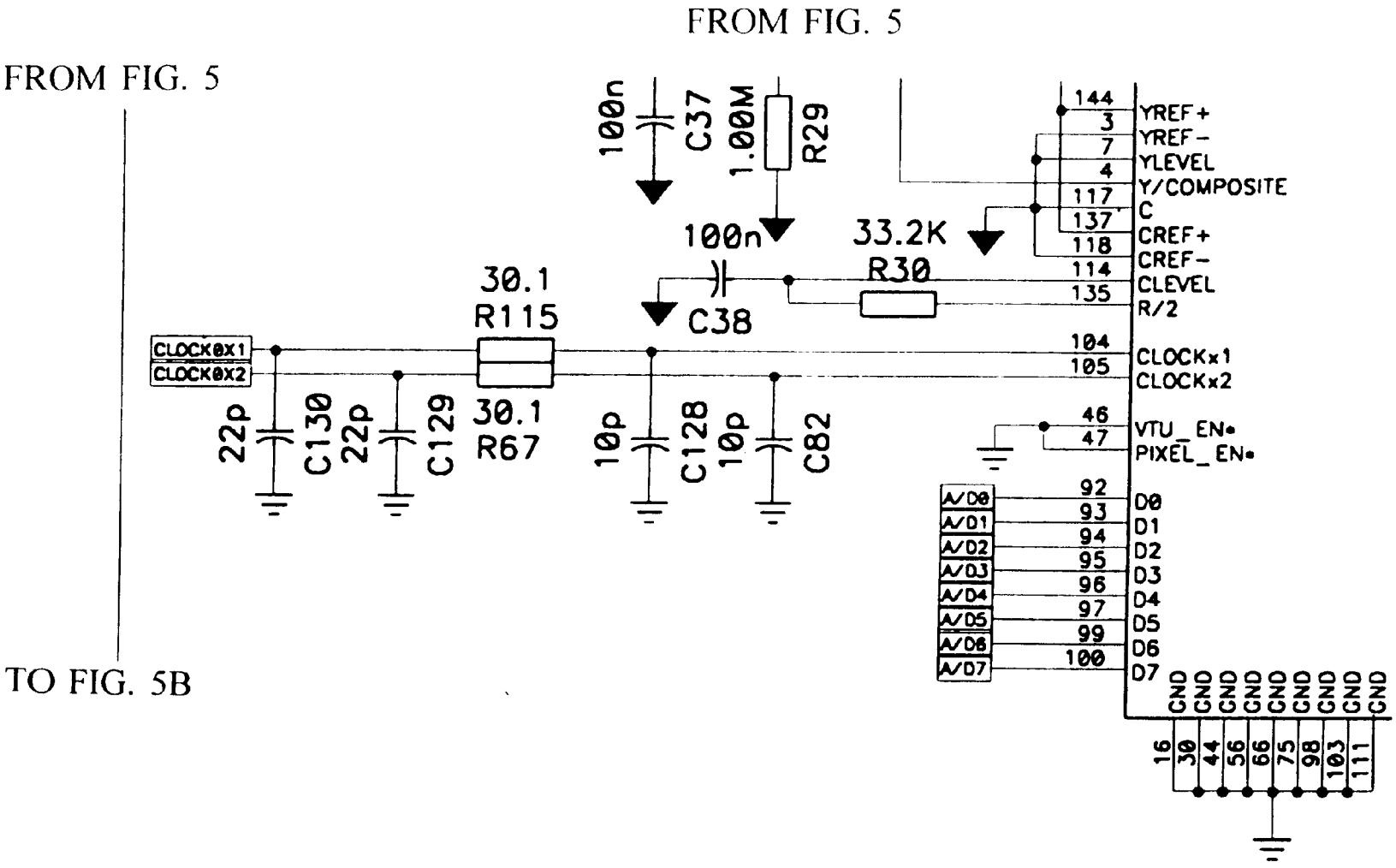
Figure 5B:
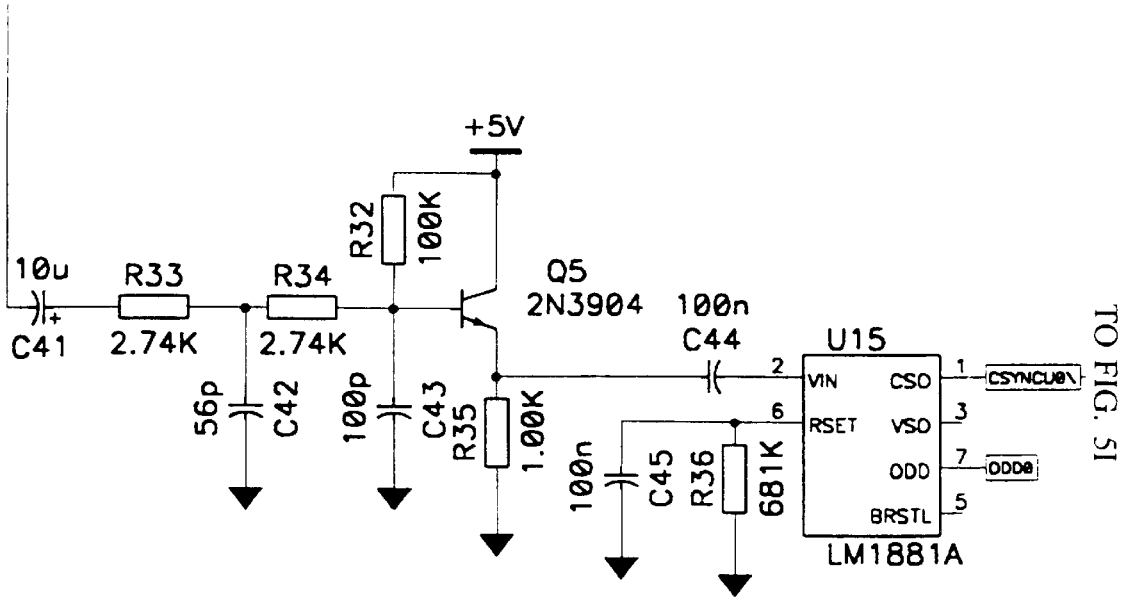
Figure 5C:
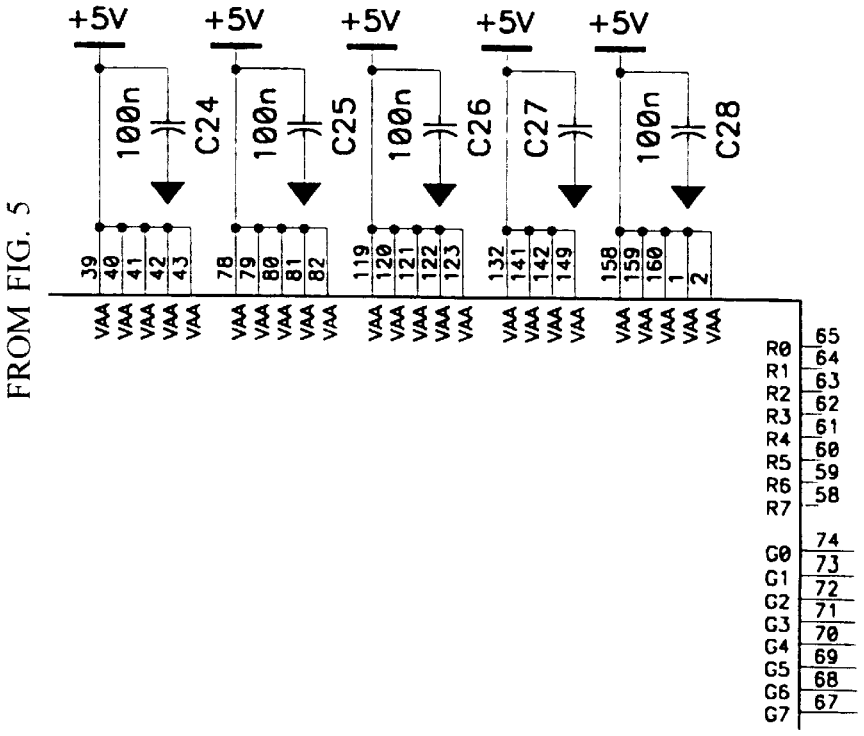
Figure 5D:
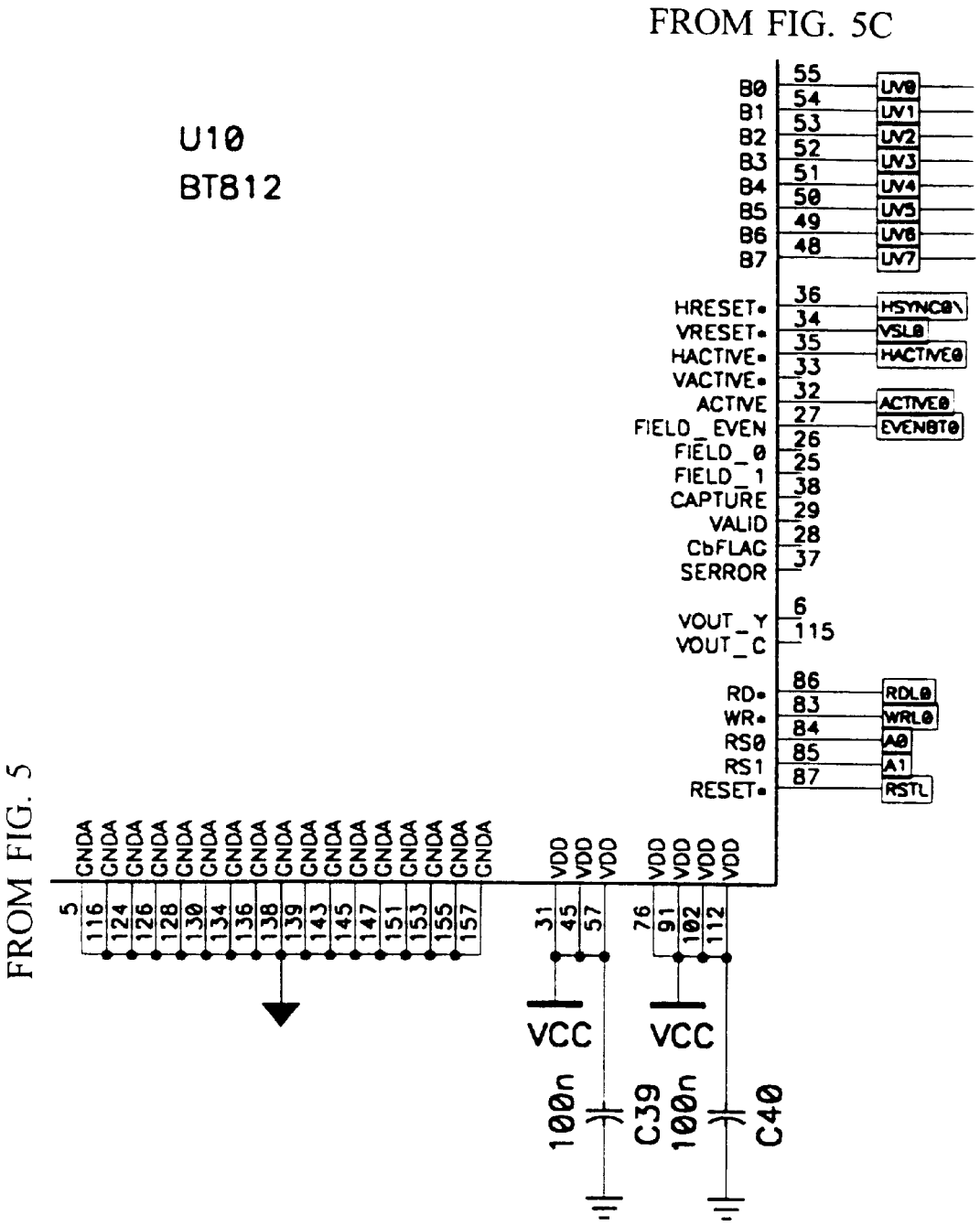
Figure 5E:
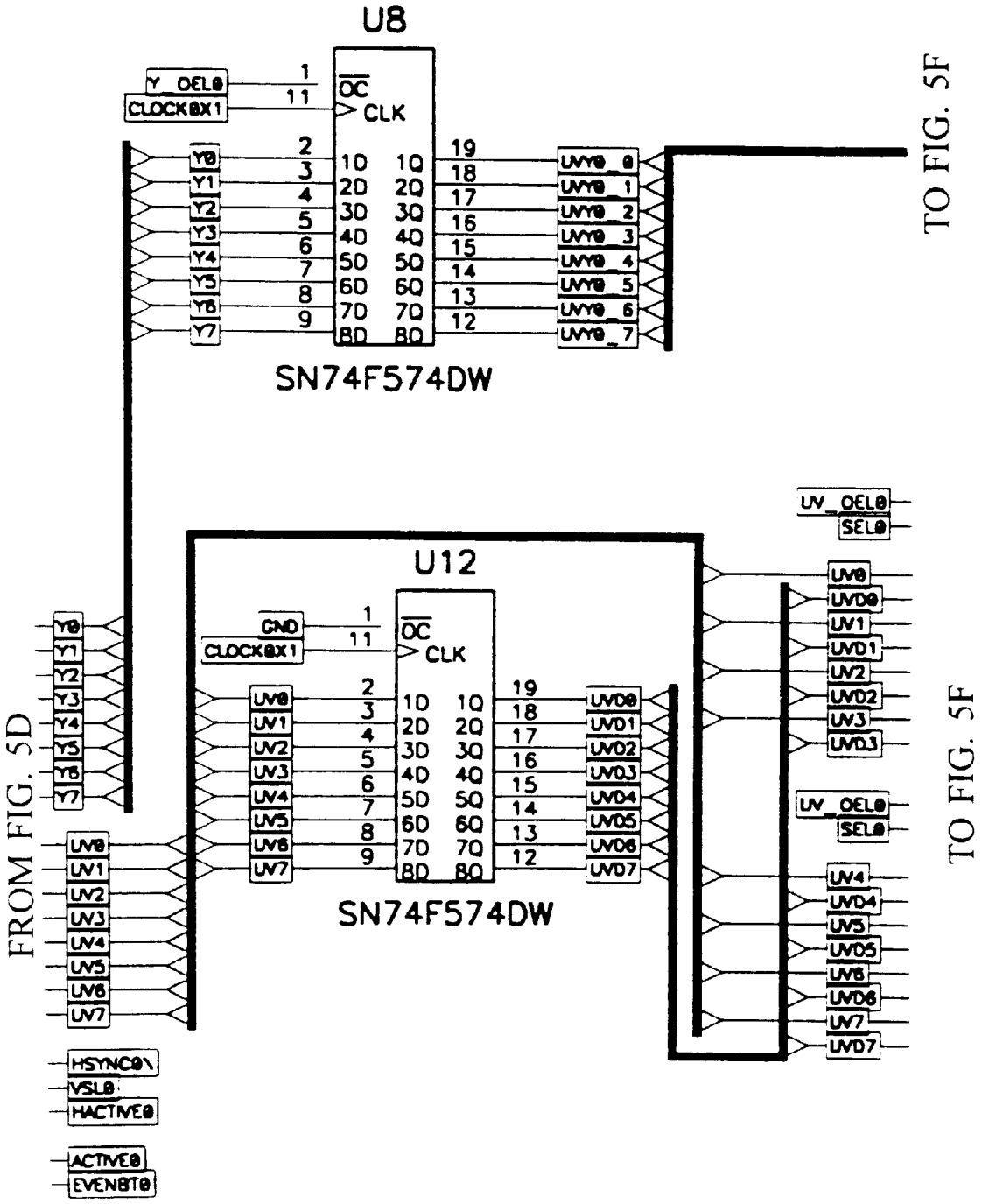
Figure 5F:
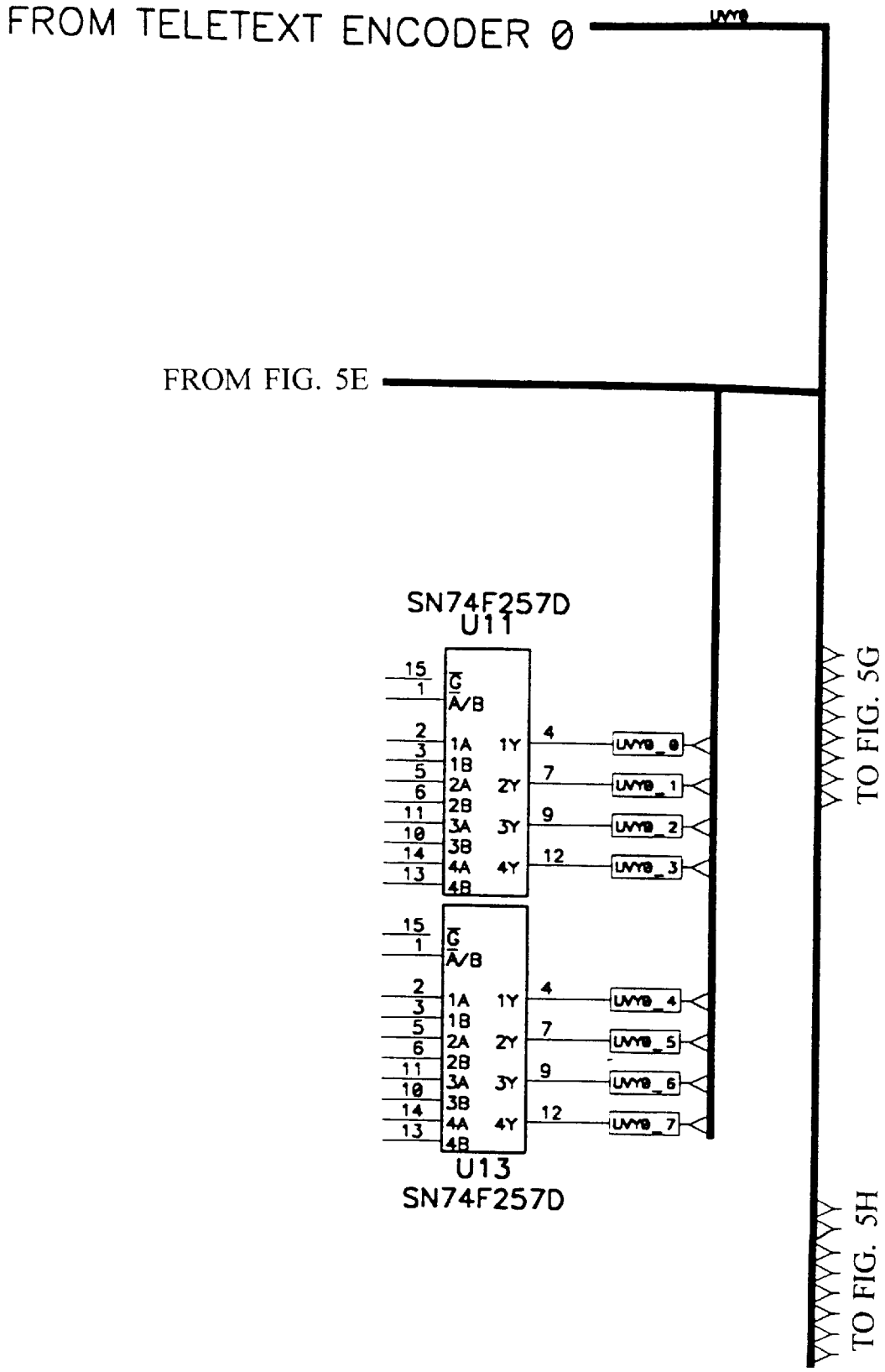
Figure 5G:
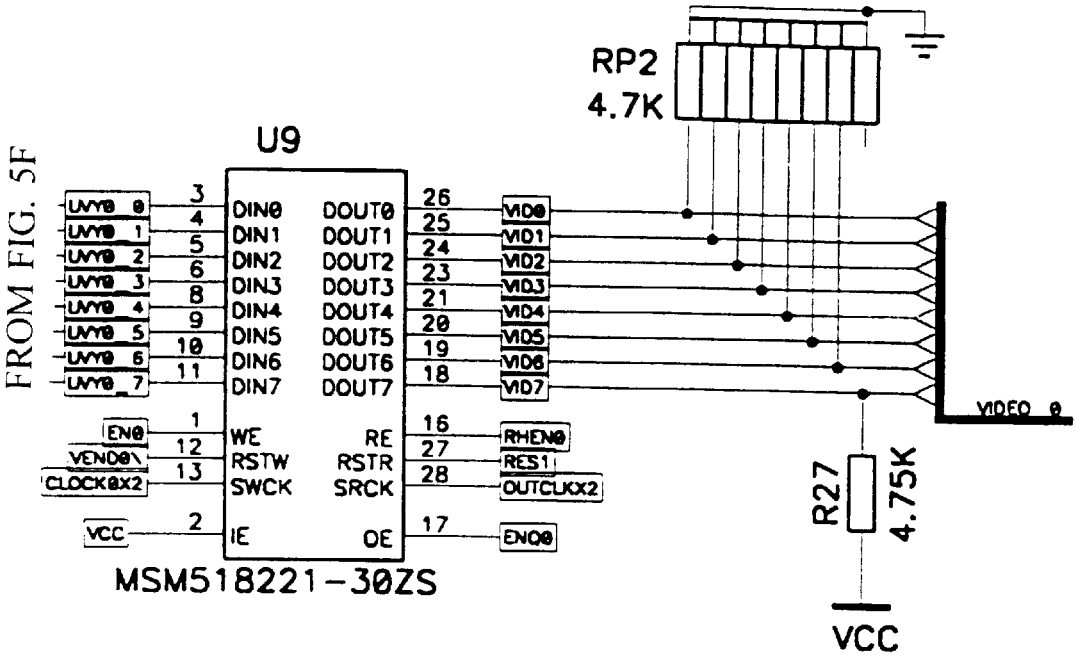
Figure 5H:
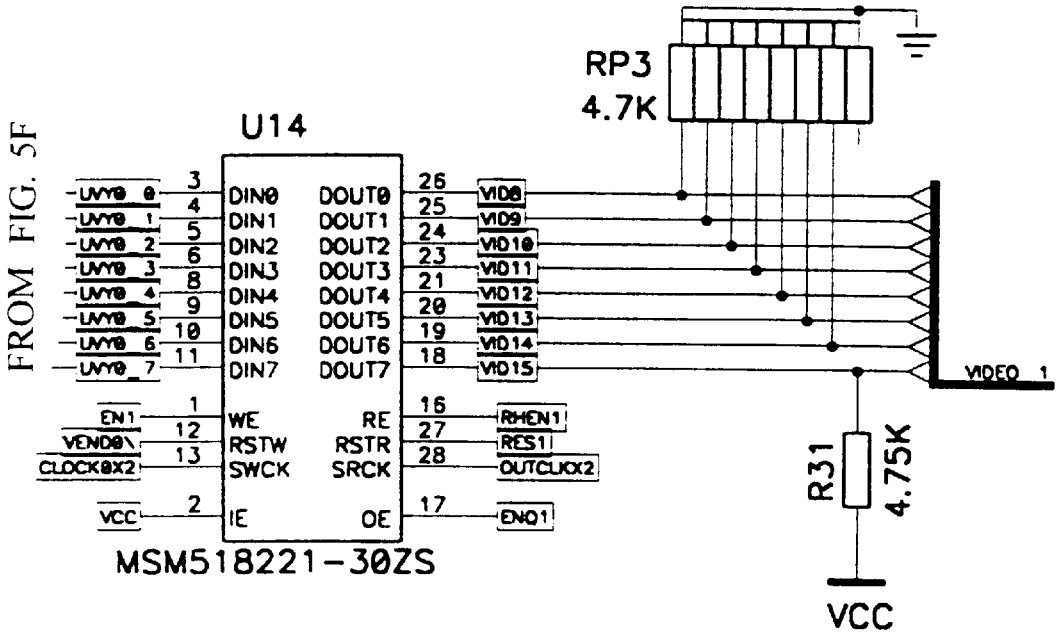
Figure 5I:
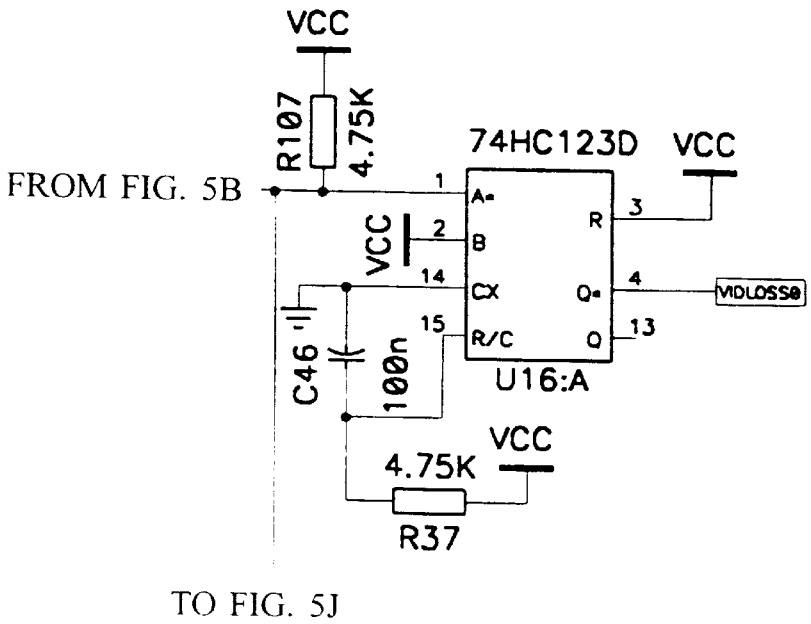
Figure 5J:
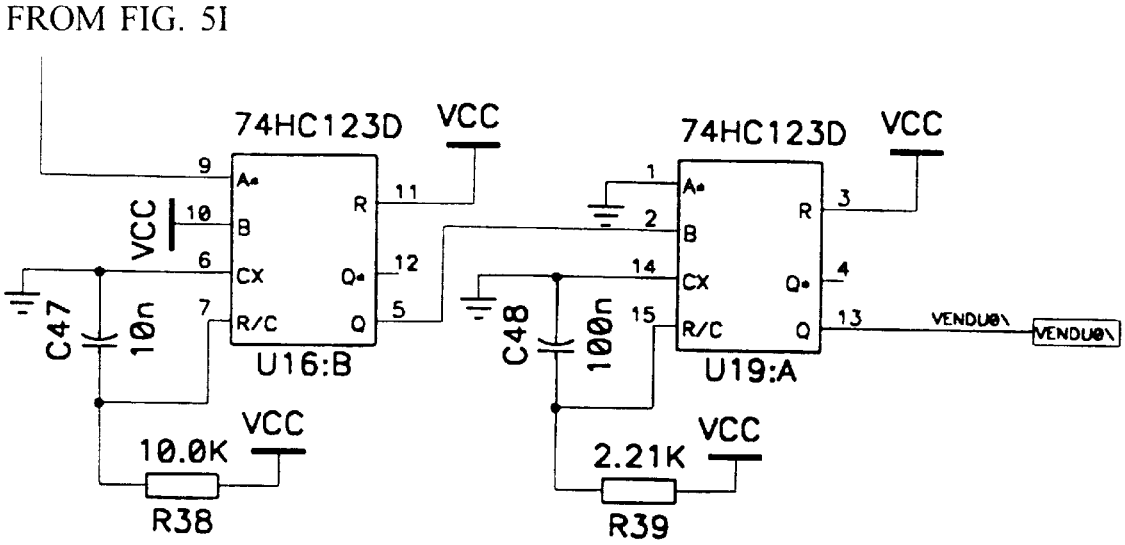
Figure 5K:
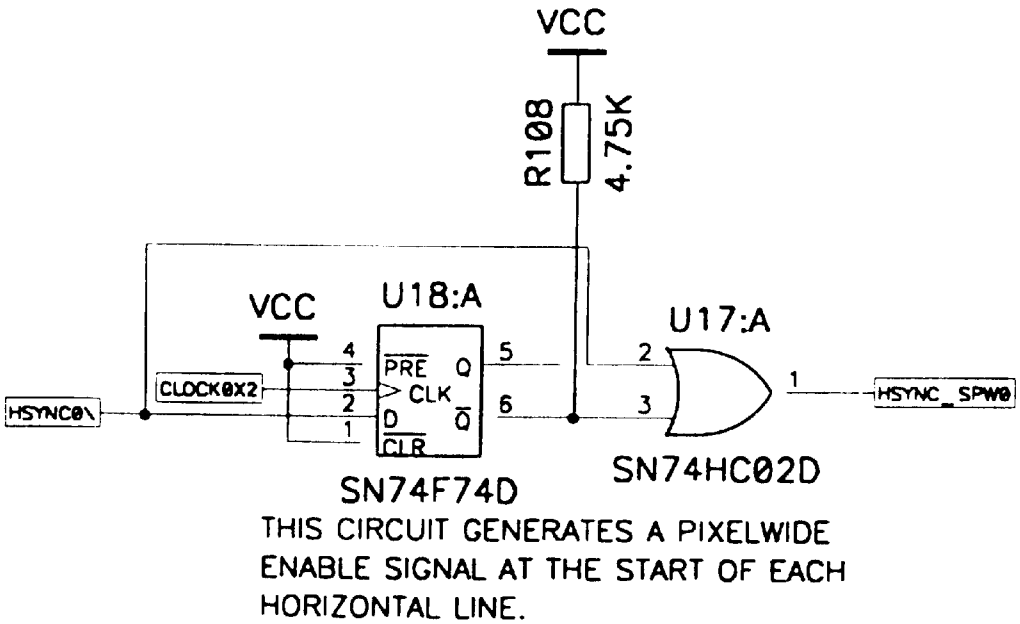
Figure 5K:
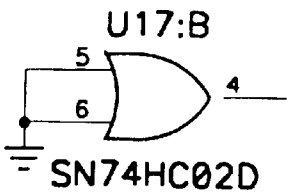
Figure 6:
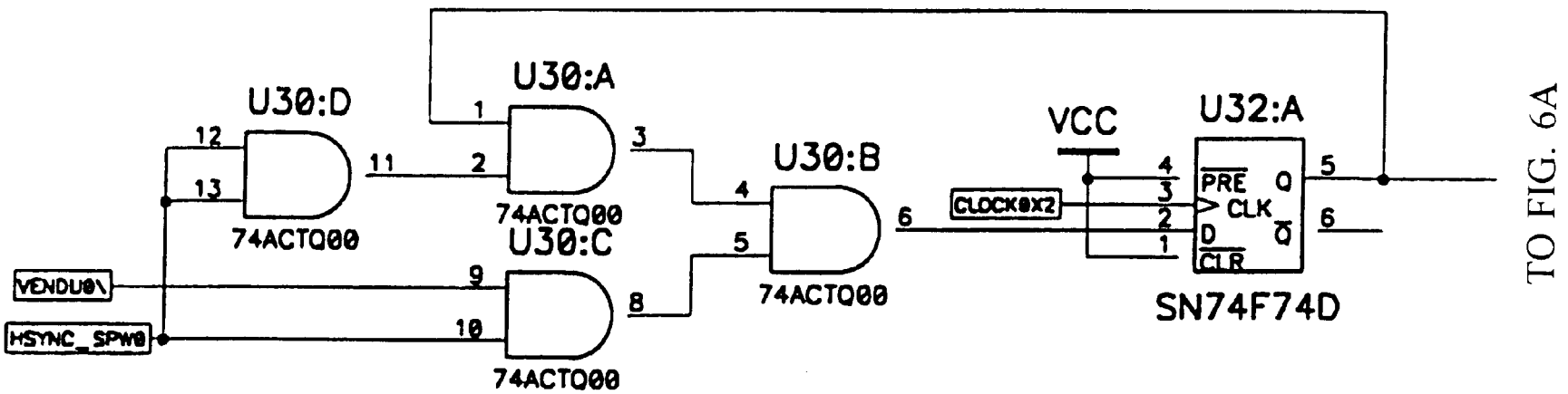
Figure 6A:
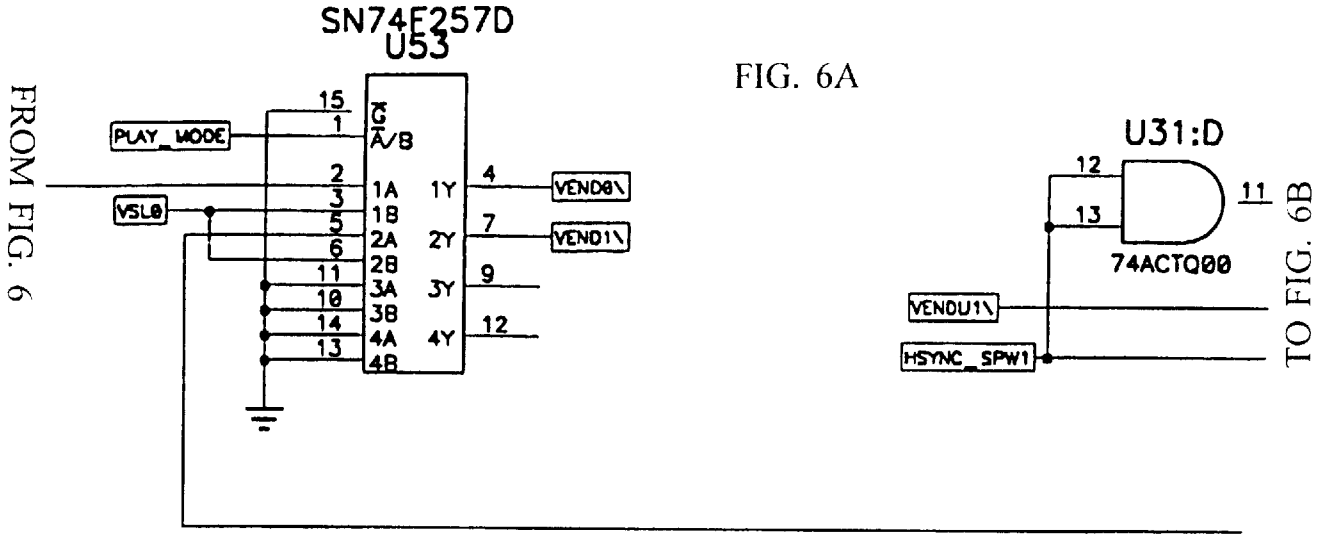
Figure 6B:
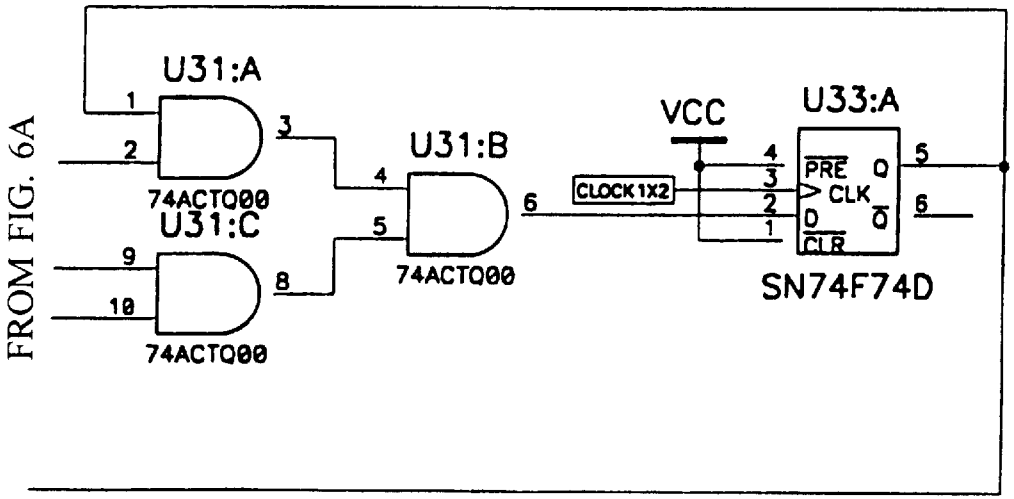
Figure 6C:
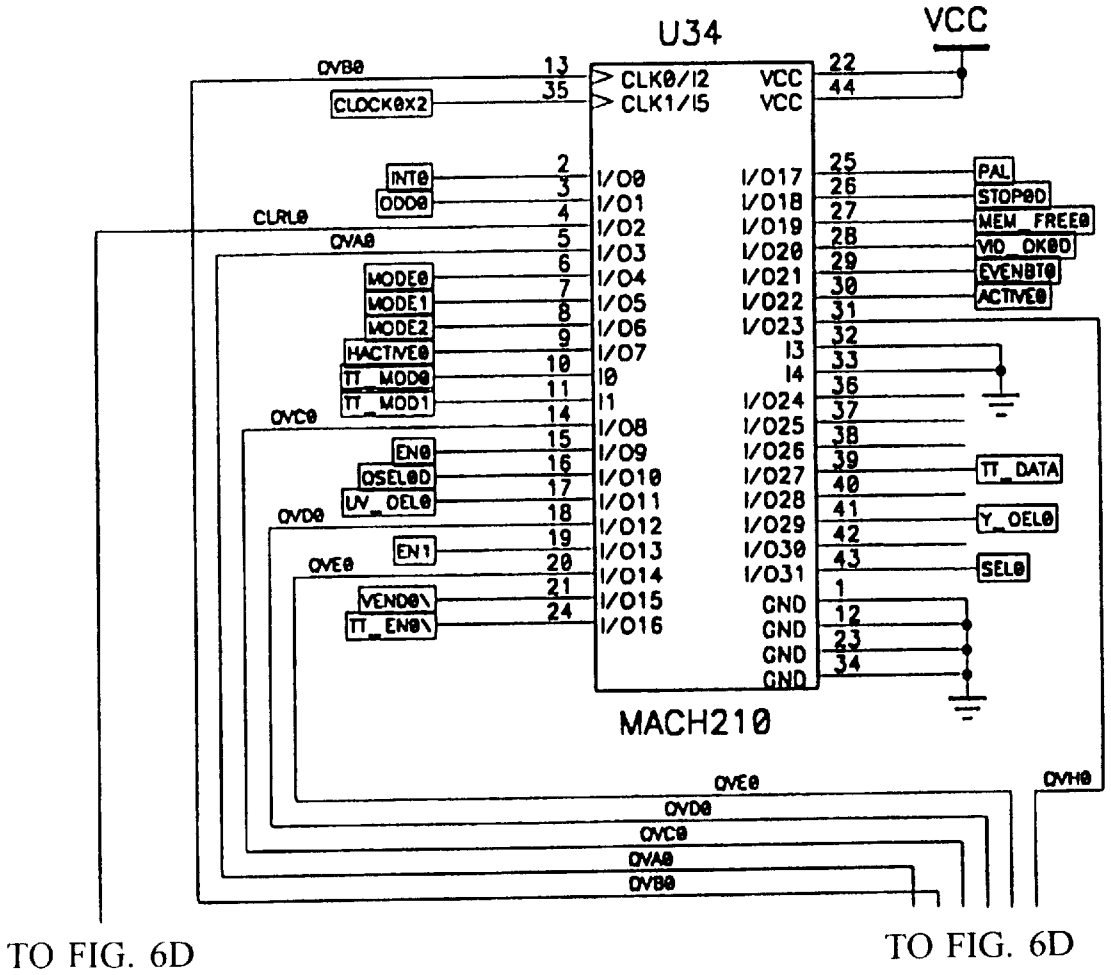
Figure 6D:
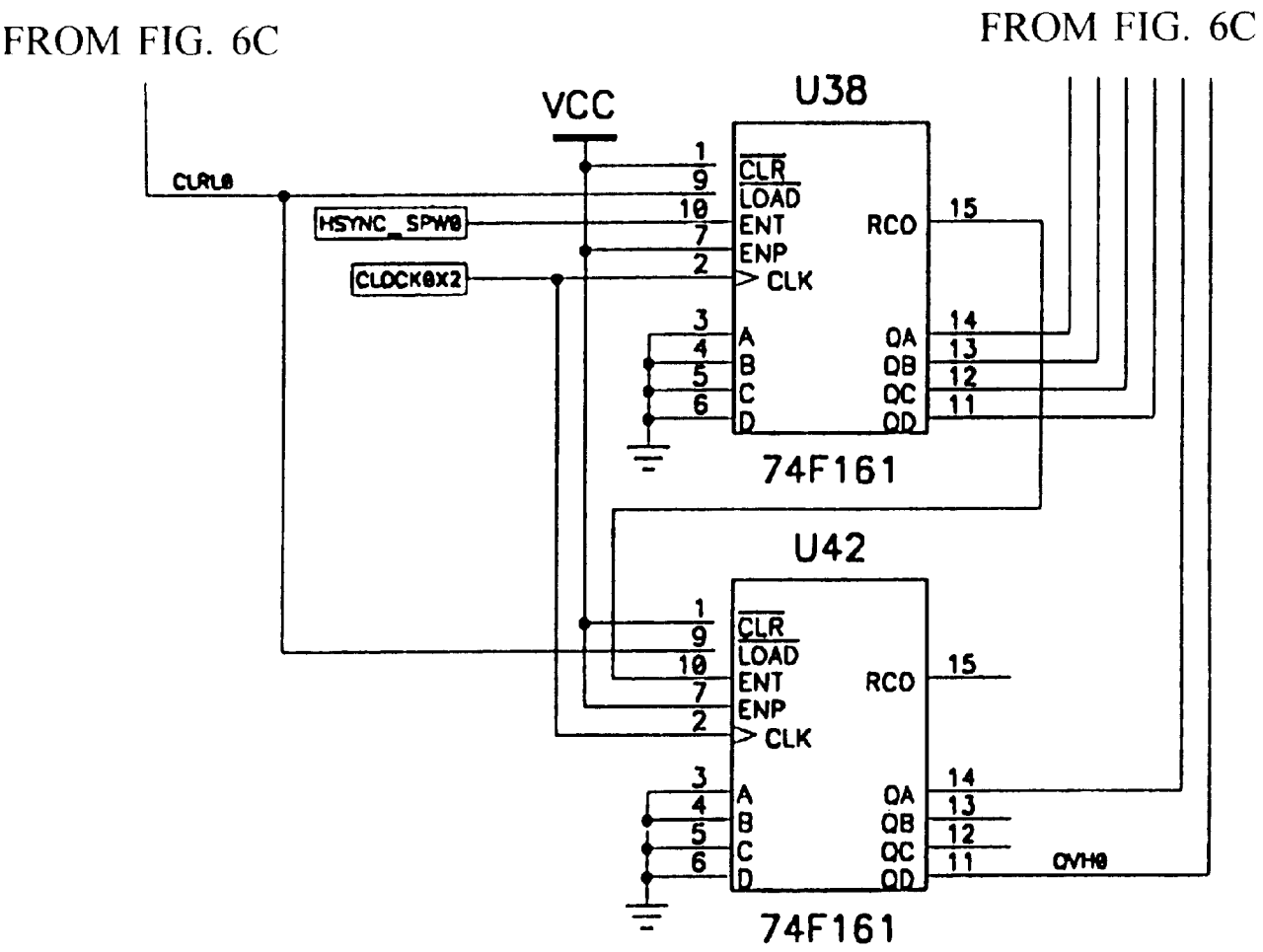
Figure 6E:
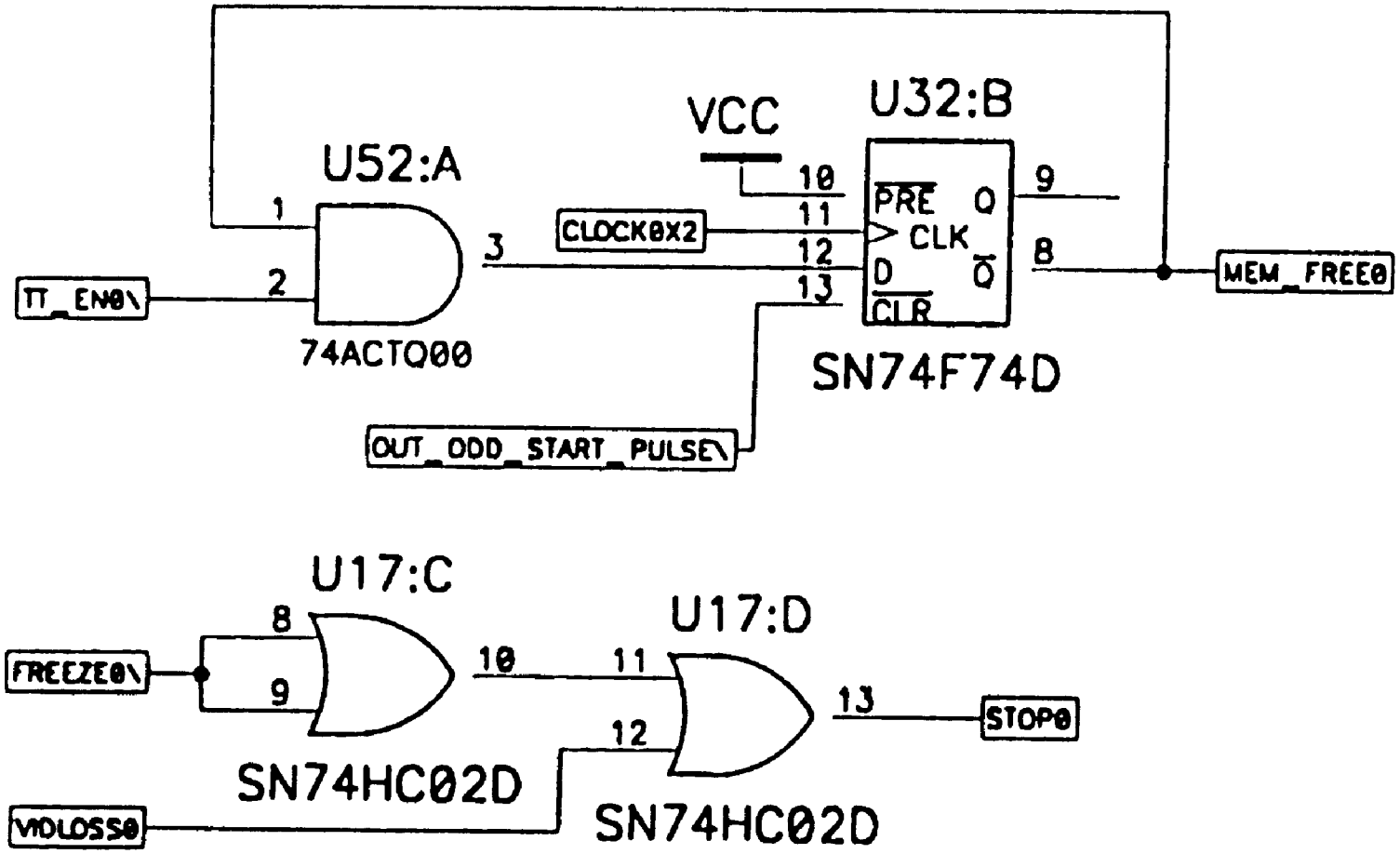
Figure 6F:
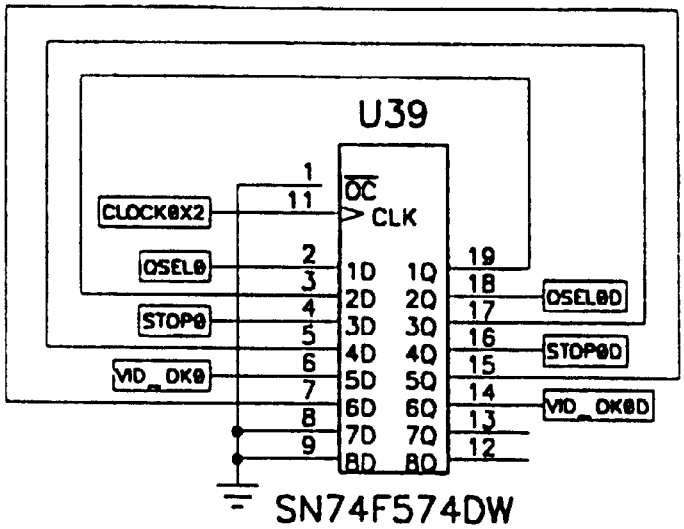
Figure 6G:
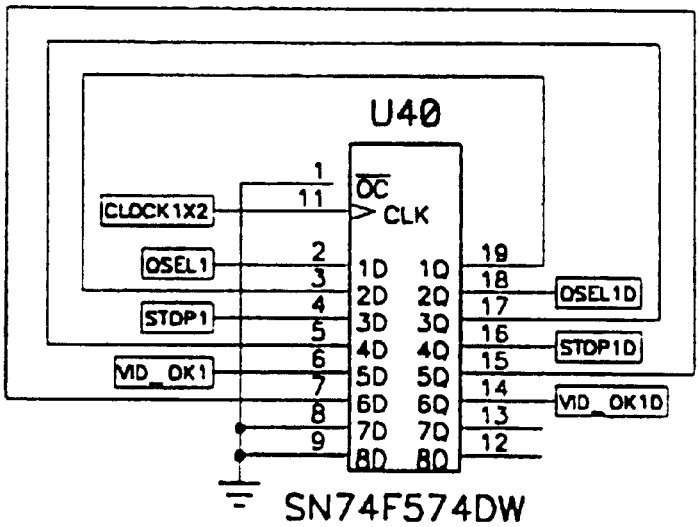
Figure 6H:
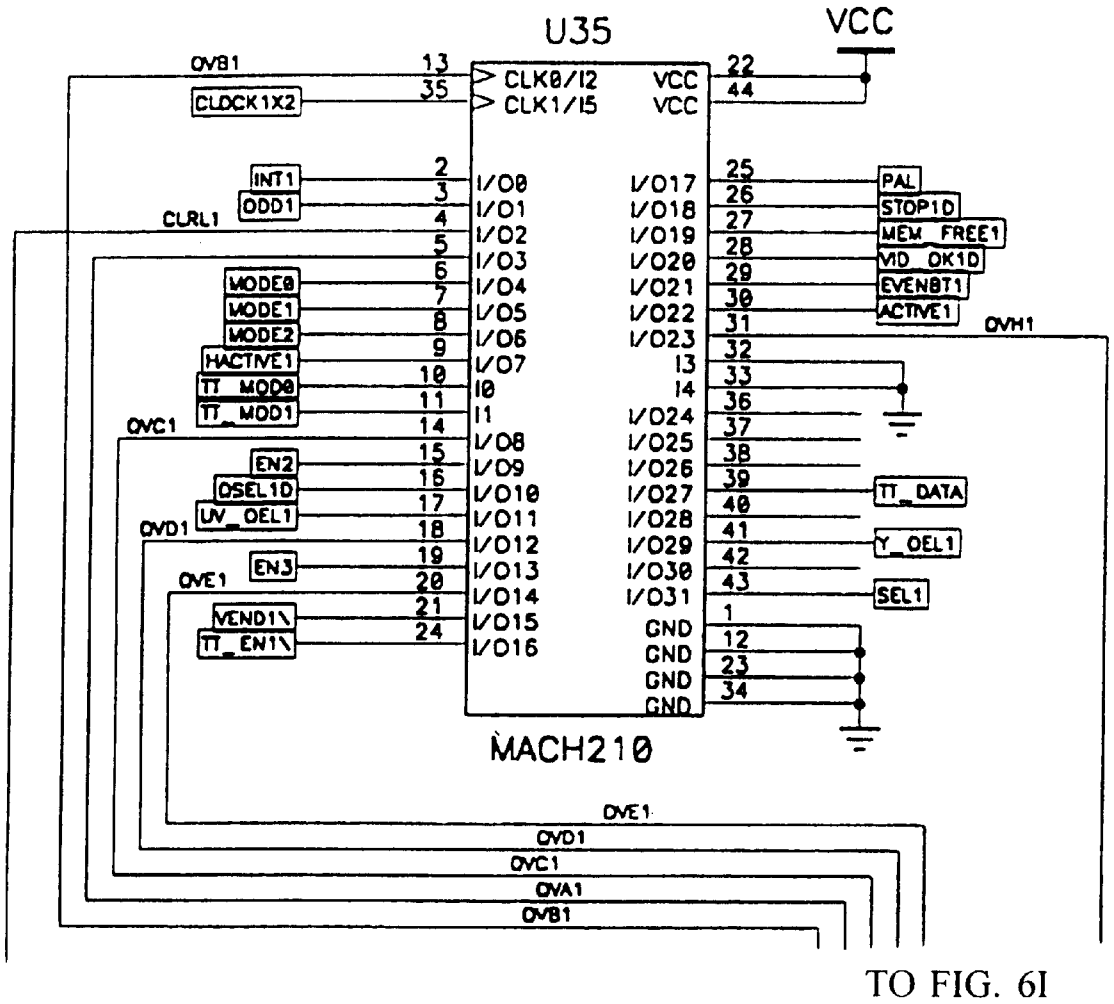
Figure 6I:
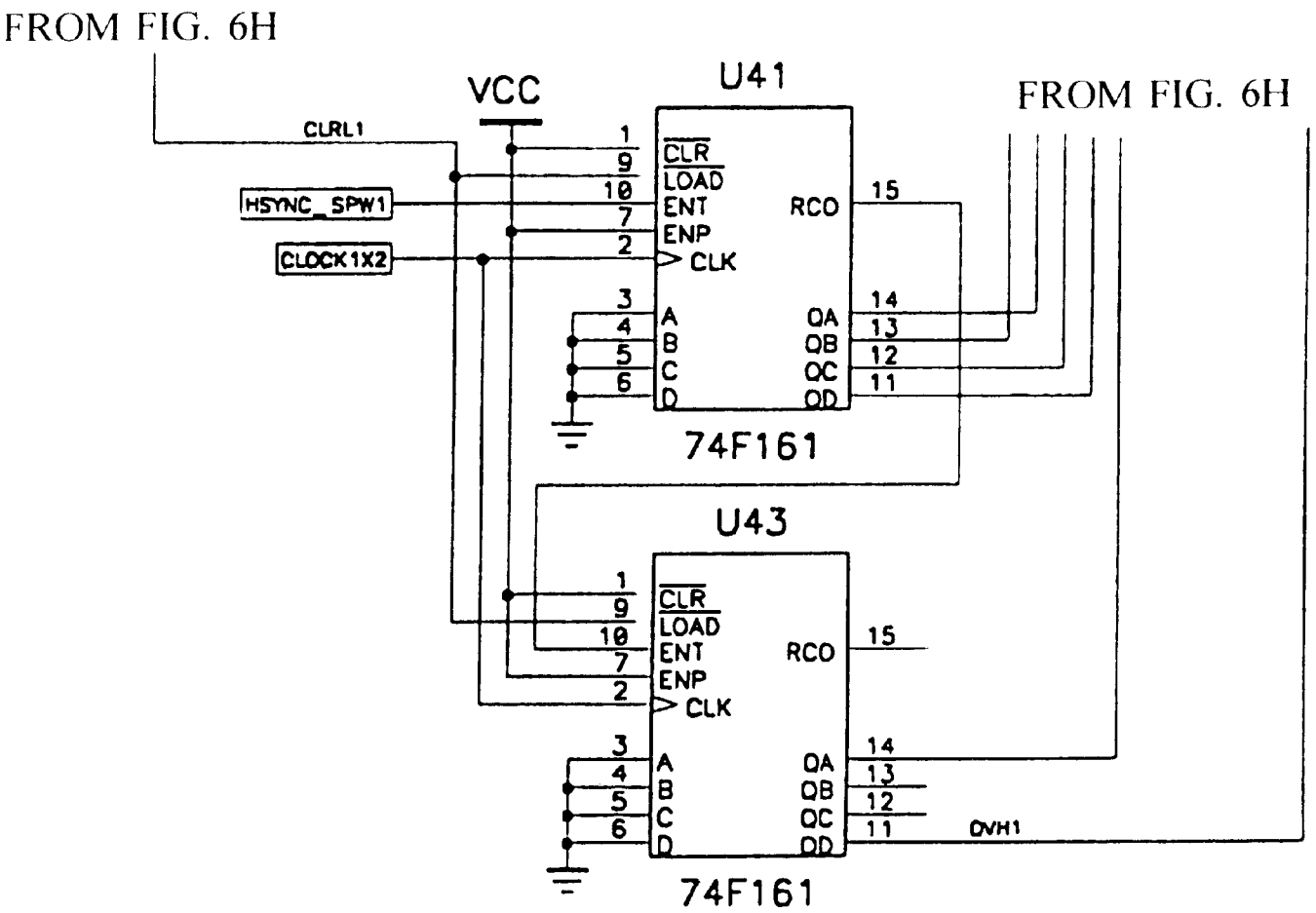
Figure 6J:
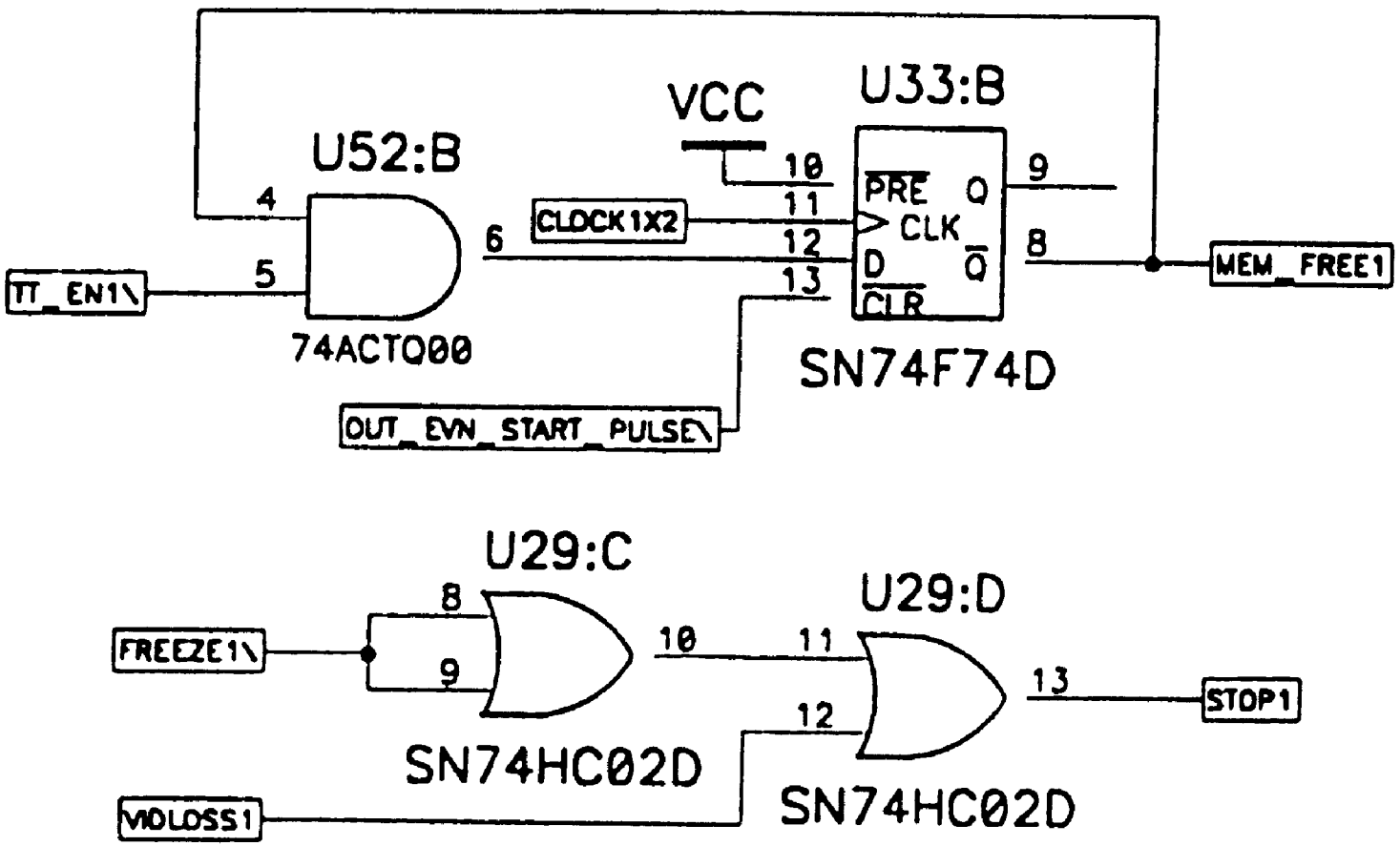

A simplified block schematic diagram of the apparatus of the invention, shoving the dual channels, is shown in FIG. 3. The circuitry of each channel is shown in detail in FIGS. 4 to 5.

In the illustrated embodiment, eight industry standard NTSC or PAL video sources can be selected one at a time via an arrangement of industry standard analog switches 10. (The video inputs are typically colour video sources but may optionally include some monochrome inputs. For purposes of this example, a typical signal from a colour video source will be discussed.) The selected analog video is supplied via an output 12 (in FIG. 4) to the decoder circuit in FIG. 5.

After the 8:1 analog switch circuit 10, the selected video source signal splits into two paths and undergoes two separate parallel processes.

In the first path, the normal action of a commercially available video decoder IC is utilised. The video signal passes via an anti-aliasing filter 14 into the decoder IC 16. The anti-aliasing filter should have a sharp roll-off at about 6.24 Mhz. The filter configuration shown in FIG. 5 achieves the required roll-off relatively economically. The decoder IC 15 is a readily available NTSC/PAL to YCrCb Decoder such as the BT812 manufactured by Brooktree Corporation of San Diego, Calif. The setup and supporting circuitry for the BT812 is in accordance with the Brooktree publication L812001, Rev E or later. The digital output 18 of the BT812 is 4:2:2, YUV digital representation of one field of the analog video input at the output 12 of the analog switch circuit 10.

In the second path from the output 12, the video signal passes through a low pass filter and buffer which is recommended but not essential, and which conditions the signal for a synchronisation circuit 20 based on an LM1881 sync separator IC. The LM1881 is the preferred sync separator in this application and is manufactured by National Semiconductor. The composite sync output from the LM1881 is fed to monostable timers 22 and 24, to generate a fast vertical synchronising signal and to provide early detection of the vertical sync, as follows.

The first monostable 22 receives the composite sync signal extracted from the sync separator as its input. The period of the first monostable 22 is set to approximately 43uS, which is 67% of the time taken for one video line, and it will therefore generate at its output a negative pulse, starting about two thirds of the way through a normal length video line. During the vertical sync (VSYNC) half-line serrations, however, this monostable will be retriggered before it can time out, and thus its output will stay high.

The second monostable 24 has its delay set to 150% of the time taken for a video line, about 96 uS. As a result the monostable 24 will be reset by the above negative pulses from the monostable 22, but will time out during the VSYNC period, giving an early VSYNC signal compared to that which will be output by the LM1881 for the same input signal.

This valid early vertical sync signal is synchronised to the BT812 decoder line sync output in the logic block 26, and the vertical sync signal is used in a state machine as described below.

The flow of digital video information from the BT812 video decoder 16 to a memory circuit 28 is controlled with signals generated by a Finite State Machine (FSM) residing in a suitable programmable logic device 30 such as the MACH210.

The FSM implemented in the MACH210 is assisted by an external line counter 32, typically a 74F161. The functions of the FSM can be broken into 3 main sections:

Validate: In this section the vertical sync of a new video source is tested to see if it is at least 5 video lines wide. If true the FSM proceeds to the next section. If not true, it indicates a false or late vertical sync and the FSM then waits for the next vertical sync from the same video source.

Vertical delay: This section is only executed once the "validate" section is successfully completed. The FSM starts the external counter 32 and waits until the correct number of lines has been delayed, which is to coincide with the start of active video on the digital output lines 18 of the decoder 16.

Vertical mode: At this stage, the FSM enables writing to the memory 28 via the logic block 26. Since all of the horizontal synchronising signals of the decoder 16 are fast locking, these signals me used to generate horizontal timing signals to ensure that only video data from the active portion of each line is written into memory. If an alternate decoder is selected with slower horizontal line synchronising, an external horizontal sync circuit with design logic similar to the invention's logic for generating a fast vertical synchronising signal may become necessary.

At the end of the field, upon detecting the presence of the vertical sync pulse, the FSM generates an interrupt to a controlling means circuit 34, which then switches the analog input switch 10 to another channel, and forces the FSM back into the "validate" mode. This completes one normal cycle of the machine.

A logic block 36, consisting of registers and digital switches controlled by the FSM output, is used to pack data into the memory 28 in a suitable format, such as CCIR 656 compatible format.

The digital memory 28 can be one of many dual port memory types, such as field memory or VRAM, and the choice depends on the intended application of the digital data and relative costs. For the video TDM application in this example, a 2 Mbit field memory MSM51821-30ZS manufactured by OKI Semiconductor was selected, and two field memories are used, 28a and 28b. Since only one field of video data is stored at a time, the memory size required for one channel of a dual decoder system to store one field of chrome and luma information, with CCIR compatible 720 pixel horizontal resolution, is 414 720 bytes. This is calculated as follows:

| | |
|---|---|
| 288 × | (lines in 1 field of PAL video) |
| 720 × | (pixels in 1 line, of video data) |
| 2 | (1 byte luma and 1 byte chroma per pixel) |
| 414 720 | bytes or 3 317 760 bits |

The FSM will only enable writing to memory while digital data from a new field is being output from the decoder 16, and it will enable writing immediately that a valid new field is output by the decoder. It essentially replaces and improves the BT812 decoder's HACTIVE output from this video TDM application, which cannot be reliably used as an Enable signal until more than one field from the new input video source has begun image digitisation in the decoder.

The described system has a number of advantages over prior art systems. Each input video source will have at least twice as many new fields in the multiplexer video data stream over any given time period as was previously achievable. This has the result that events of short duration are more likely to be captured in the data stream. This may be, for example, important in multi-camera surveillance systems. Due to the increased frequency of new fields in the decoded signal from any source, the signal will have a more lifelike and less jumpy appearance. The system makes it possible to include one input video source in the multiplexed data stream at "real time" rates (the rate at which a conventional TV picture is updated) while still including other video input signals in the multiplexed output. This can be particularly useful, for example, if an unusual or alarm situation requires that one particular input video source be recorded or transmitted at maximum rate (normally the standard real-time TV field rate). In such a case, the source of interest can be monitored without loss of information, while still allowing monitoring of the other input video sources.

The invention also makes it possible to record two unsynchronised input colour video sources in real-time on a single, unmodified, industry standard VCR, with both inputs being recorded in real-time. Similarly, the invention makes it possible to transmit two input colour video signals in real-time over a industry standard medium such as co-axial cable.

We claim:

1. A method of processing video signals comprising:

(a) selecting one of a plurality of video input signals;

(b) applying the selected video input signal to an analog to digital video decoder;

(c) deriving from the selected video input signal an early synchronisation signal corresponding to the start of a field of the signal;

(d) applying the early synchronisation signal to a control input of the video decoder to enable an output of the video decoder;

(e) reading data from the enabled output corresponding to the first available field of the selected video input signal;

(f) repeating steps (a) to (e) for further selected video input signals; and (g) combining the data read from the enabled output of the video decoder in each step (e) to form a time division multiplexed video signal.

2. A method according to claim 1 wherein steps (a) to (f) are carried out simultaneously and independently for successively selected video input signals, to allow successive fields of the time division multiplexed video signal to be combined without delays caused by lack of synchronisation between the selected video input signals.

3. A method according to claim 1 wherein the early synchronisation signal is derived from the selected video input signal by independently extracting vertical synchronisation information from the signal while the signal is undergoing analog to digital conversion.

4. A method according to claim 1 wherein the time division multiplexed video signal data read from the output of the video decoder is encoded by a digital to analog video encoder for storage or transmission in analog form.

5. Apparatus for processing video signals comprising:

switch means for selecting any one of a plurality of video input signals;

an analog to digital video decoder connected to an output of the switch means;

a synchronisation circuit associated with the video decoder for generating an early synchronisation signal from a selected video input signal corresponding to the start of a field of the signal and for applying the early synchronisation signal to a control input of the video decoder to enable an output thereof;

storage means connected to the output of the video decoder for storing data therefrom corresponding to the first available field of the selected video input signal; and encoder means for combining data from the storage means corresponding to successive fields of selected video input signals into a time division multiplexer video signal.

6. Apparatus according to claim 5 wherein the synchronisation circuit comprises a video sync separator arranged to extract vertical synchronisation information from the video input signal independently while the signal is undergoing analog to digital conversion.

7. Apparatus according to claim 6 wherein the synchronisation circuit further includes timer means arranged to generate an early vertical synchronisation signal derived from a composite sync signal output of the video sync separator.

8. Apparatus according to claim 5 wherein the storage means comprises at least one random access memory arranged to store data corresponding to a single field of video data.

9. Apparatus for processing a plurality of unsynchronised video signals comprising the apparatus of claim 5 arranged in dual channels and including control means for selecting different video sources for each of the channels, and for combining stored data from the respective channels corresponding to successive fields of the different video sources.

*10. A method of processing video signals comprising:*

*(a) selecting one of a plurality of video input signals;*

*(b) applying the selected video input signal to an analog to digital video decoder;*

*(c) deriving from the selected video input signal a synchronisation signal corresponding to the start of a field of the signal;*

(*d*) *applying the synchronisation signal to a control input of the video decoder to enable an output of the video decoder;*

(*e*) *reading data from the enabled output corresponding to the first available field of the selected video input signal;*

(*f*) *repeating steps* (*a*) *to* (*e*) *for further selected video input signals; and*

(*g*) *combining the data read from the enabled output of the video decoder in each step* (*e*) *to form a time division multiplexed video signal.*

*11. A method according to claim 10 wherein steps* (*a*) *to* (*f*) *are carried out simultaneously and independently for successively selected video input signals, to allow successive fields of the time division multiplexed video signal to be combined without delays caused by lack of synchronisation between the selected video input signals.*

*12. A method according to claim 10 wherein the synchronisation signal is derived from the selected video input signal by independently extracting vertical synchronisation information from the signal while the signal is undergoing analog to digital conversion.*

*13. A method according to claim 10 wherein the time division multiplexed video signal data read from the output of the video decoder is encoded by a digital to analog video encoder for storage or transmission in analog form.*

*14. Apparatus for processing video signals comprising:*

*a switch operative to select any one of a plurality of video input signals;*

*an analog to digital video decoder connected to an output of the switch;*

*a synchronisation circuit associated with the video decoder for generating a synchronisation signal from a selected video input signal corresponding to the start of a field of the signal and for applying the synchronisation signal to a control input of the video decoder to enable an output thereof;*

*a storage device connected to the output of the video decoder for storing data therefrom corresponding to the first available field of the selected video input signal; and*

*an encoder operative to combine data from the storage device corresponding to successive fields of selected video input signals into a time division multiplexer video signal.*

*15. Apparatus according to claim 14 wherein the synchronisation circuit comprises a video sync separator arranged to extract vertical synchronisation information from the video input signal independently while the signal is undergoing analog to digital conversion.*

*16. Apparatus according to claim 15 wherein the synchronisation circuit further includes a timer arranged to generate a vertical synchronisation signal derived from a composite sync signal output of the video sync separator.*

*17. Apparatus according to claim 14 wherein the storage device comprises at least one random access memory arranged to store data corresponding to a single field of video data.*

*18. Apparatus for processing a plurality of unsynchronised video signals comprising the apparatus of claim 14 arranged in dual channels and including a controller for selecting different video sources for each of the channels, and for combining stored data from the respective channels corresponding to successive fields of the different video sources.*

* * * * *